(12) United States Patent
Cavelius

(10) Patent No.: US 9,776,812 B2
(45) Date of Patent: Oct. 3, 2017

(54) DEVICE AND METHOD FOR LAYERED STACKING A SUPPORT

(71) Applicant: Dematic GmbH, Heusenstamm (DE)

(72) Inventor: Jörg Cavelius, Frankfurt (DE)

(73) Assignee: Dematic GmbH, Heusenstamm (DE)

( * ) Notice: Subject to any disclaimer, the term of this patent is extended or adjusted under 35 U.S.C. 154(b) by 185 days.

(21) Appl. No.: 14/412,396

(22) PCT Filed: Jun. 26, 2013

(86) PCT No.: PCT/EP2013/063342
§ 371 (c)(1),
(2) Date: Dec. 31, 2014

(87) PCT Pub. No.: WO2014/005893
PCT Pub. Date: Jan. 9, 2014

(65) Prior Publication Data
US 2016/0001990 A1    Jan. 7, 2016

(30) Foreign Application Priority Data

Jul. 6, 2012   (DE) .......................... 10 2012 106 112

(51) Int. Cl.
*B65G 57/22* (2006.01)
*B65G 57/10* (2006.01)
(Continued)

(52) U.S. Cl.
CPC ............. *B65G 57/10* (2013.01); *B65G 47/46* (2013.01); *B65G 47/82* (2013.01); *B65G 57/035* (2013.01); *B65G 57/22* (2013.01); *B65G 65/00* (2013.01)

(58) Field of Classification Search
CPC ........ B65G 57/10; B65G 47/46; B65G 47/82; B65G 57/035; B65G 57/22; B65G 65/00;
(Continued)

(56) References Cited

U.S. PATENT DOCUMENTS 2,883,074 A   4/1959   Boehl
2,979,872 A   4/1961   Verrinder
(Continued)

FOREIGN PATENT DOCUMENTS

CN   102101593   6/2011
CN   104030046   9/2014
(Continued)

OTHER PUBLICATIONS

International Search Report and Written Opinion from corresponding International Application No. PCT/EP2013/063342, dated Aug. 15, 2013.
(Continued)

*Primary Examiner* — Anna Momper
*Assistant Examiner* — Lynn Schwenning
(74) *Attorney, Agent, or Firm* — Gardner, Linn, Burkhart & Flory, LLP

(57) ABSTRACT

A device and method for automatically stacking packages on a roll container in a predetermined spatial arrangement for forming a stack, comprising at least one feed conveyor which arranges the individual packages in a predetermined order; a lifting and lowering unit for lifting and lowering of the roll container in the Y-direction; at least one sliding plate and one pusher in order to transport the packages in the Z-direction to the predetermined position in the stack; moveable journals being provided in order to separate the lateral walls of the roll container. In a particular embodiment the journals are arranged on rotating disks.

21 Claims, 26 Drawing Sheets

(51) Int. Cl.
*B65G 57/03* (2006.01)
*B65G 65/00* (2006.01)
*B65G 47/46* (2006.01)
*B65G 47/82* (2006.01)

(58) Field of Classification Search
CPC ...... B65G 47/086; B65G 61/00; B65G 47/08; B65G 57/24; B65G 57/02; B65G 57/00; B65B 35/50; B65B 61/20
USPC ......... 414/790.3, 791.5, 791.6, 792.6, 792.7, 414/794.7, 799
See application file for complete search history.

(56) References Cited

U.S. PATENT DOCUMENTS

| | | | |
|---|---|---|---|
| 3,056,513 A | 10/1962 | Von Gal | |
| 3,066,579 A * | 12/1962 | Brush | B31B 1/06 493/181 |
| 3,068,624 A | 12/1962 | Linda | |
| 3,257,015 A | 6/1966 | Annable et al. | |
| 3,340,672 A * | 9/1967 | Kayser | B65B 35/50 198/418 |
| 3,529,732 A | 9/1970 | Wayne | |
| 3,543,949 A | 12/1970 | Weier | |
| 3,594,977 A | 7/1971 | Grasvoll | |
| 3,605,377 A * | 9/1971 | Sabel | B65B 35/50 53/242 |
| 3,612,300 A | 10/1971 | Berghgracht | |
| 2,090,129 A | 8/1973 | Kimball et al. | |
| 3,901,391 A | 8/1975 | Carlson et al. | |
| 3,923,144 A | 12/1975 | Langen | |
| 3,967,737 A | 7/1976 | Peralta et al. | |
| 3,986,621 A | 10/1976 | Bowser | |
| 4,018,031 A * | 4/1977 | Smaw | B65B 5/067 271/148 |
| 4,132,318 A | 1/1979 | Wang et al. | |
| 4,162,016 A | 7/1979 | Schmitt | |
| 4,205,934 A | 6/1980 | Pantin et al. | |
| 4,214,848 A | 7/1980 | Verwey et al. | |
| 4,255,074 A | 3/1981 | Meratti et al. | |
| 4,271,755 A | 6/1981 | Kintgen et al. | |
| 4,302,140 A | 11/1981 | Donnelly et al. | |
| 4,442,932 A | 4/1984 | Sashiki et al. | |
| 4,593,517 A | 6/1986 | Mattila | |
| 4,638,903 A | 1/1987 | Kimura | |
| 4,704,060 A | 11/1987 | Winski et al. | |
| 4,708,564 A | 11/1987 | Mylrea et al. | |
| 4,744,457 A | 5/1988 | Takimoto | |
| 4,898,511 A | 2/1990 | Rossig et al. | |
| 5,005,335 A | 4/1991 | Yourgalite et al. | |
| 5,051,058 A | 9/1991 | Roth | |
| 5,087,169 A | 2/1992 | Tubke | |
| 5,098,254 A | 3/1992 | Becicka et al. | |
| 5,169,284 A | 12/1992 | Berger et al. | |
| 5,181,820 A | 1/1993 | Sjogren et al. | |
| 5,193,973 A | 3/1993 | Tubke | |
| 5,335,903 A | 8/1994 | Martin et al. | |
| 5,348,440 A | 9/1994 | Focke | |
| 5,360,306 A | 11/1994 | Nakayama et al. | |
| 5,372,472 A | 12/1994 | Winski et al. | |
| 5,375,396 A * | 12/1994 | Huwelmann | B65B 43/54 156/114 |
| 5,407,055 A | 4/1995 | Tanaka | |
| 5,435,690 A * | 7/1995 | Binning | B65G 57/112 414/791.6 |
| 5,540,545 A | 7/1996 | Roberts et al. | |
| 5,607,282 A | 3/1997 | Brannen et al. | |
| 5,623,808 A | 4/1997 | Franklin et al. | |
| 5,701,722 A | 12/1997 | Franklin et al. | |
| 5,738,484 A | 4/1998 | Taylor | |
| 5,758,471 A | 6/1998 | Denley et al. | |
| 5,842,827 A | 12/1998 | Kwasniewski et al. | |
| 5,873,214 A | 2/1999 | Moore et al. | |
| 5,893,258 A | 4/1999 | Lancaster, III | |
| 5,927,927 A | 7/1999 | Anderson et al. | |
| 5,944,479 A * | 8/1999 | Kanaya | B65G 57/24 198/431 |
| 6,056,496 A | 5/2000 | Myers et al. | |
| 6,164,900 A | 12/2000 | Labell et al. | |
| 6,264,422 B1 | 7/2001 | Hennes et al. | |
| 6,453,784 B1 * | 9/2002 | Cotteverte | A21C 15/04 83/145 |
| 6,533,533 B1 | 3/2003 | Heston | |
| 6,594,970 B1 | 7/2003 | Hyne et al. | |
| 6,602,037 B2 | 8/2003 | Winkler | |
| 6,678,582 B2 | 1/2004 | Waled | |
| 6,817,824 B2 | 11/2004 | Winkler | |
| 6,845,860 B1 | 1/2005 | Walker | |
| 6,866,469 B2 | 3/2005 | Harris et al. | |
| 6,880,311 B2 | 4/2005 | Winkler | |
| 6,915,904 B2 | 7/2005 | Winkler | |
| 7,047,710 B2 | 5/2006 | Winkler | |
| 7,097,045 B2 | 8/2006 | Winkler | |
| 7,153,085 B2 | 12/2006 | Clark et al. | |
| 7,244,093 B2 | 7/2007 | Watanabe et al. | |
| 7,266,422 B1 | 9/2007 | DeMotte et al. | |
| 7,296,834 B2 | 11/2007 | Clark et al. | |
| 7,309,203 B2 | 12/2007 | Clark et al. | |
| 7,686,153 B2 | 3/2010 | Tsai | |
| 7,938,614 B2 | 5/2011 | Fritzsche | |
| 8,074,431 B1 | 12/2011 | Pierson et al. | |
| 8,468,781 B2 | 6/2013 | Fritzsche et al. | |
| 9,315,337 B2 | 4/2016 | Cavelius | |
| 2004/0191049 A1 | 9/2004 | Winkler | |
| 2005/0166552 A1 | 8/2005 | Omo et al. | |
| 2006/0120850 A1 | 6/2006 | Clark et al. | |
| 2006/0182545 A1 | 8/2006 | Ray et al. | |
| 2007/0065270 A1 * | 3/2007 | Schmetzer | B65G 17/326 414/794.4 |
| 2008/0025832 A1 | 1/2008 | Pierson et al. | |
| 2008/0095601 A1 | 4/2008 | Yohe et al. | |
| 2009/0087295 A1 | 4/2009 | Fritzsche | |
| 2009/0138121 A1 | 5/2009 | Wicks et al. | |
| 2010/0178149 A1 | 7/2010 | Fritzsche | |
| 2010/0278625 A1 | 11/2010 | Wolkerstorfer | |
| 2011/0076128 A1 | 3/2011 | Johnsen et al. | |
| 2011/0277423 A1 | 11/2011 | Magri | |
| 2012/0070263 A1 | 3/2012 | Van Schijndel et al. | |

FOREIGN PATENT DOCUMENTS

| | | |
|---|---|---|
| DE | 2011458 | 10/1970 |
| DE | 1931274 | 4/1975 |
| DE | 2708160 | 9/1978 |
| DE | 2808129 A1 | 8/1979 |
| DE | 2945883 A1 | 5/1981 |
| DE | 3347474 A1 | 2/1985 |
| DE | 3906922 A1 | 10/1989 |
| DE | 3835058 | 4/1990 |
| DE | 4114215 A1 | 11/1992 |
| DE | 3712102 C2 | 5/1993 |
| DE | 4338801 A1 | 5/1995 |
| DE | 202010015150 U1 | 2/2011 |
| EP | 0487837 A1 | 8/1991 |
| EP | 0511529 A1 | 4/1992 |
| EP | 0487837 | 6/1992 |
| EP | 0498263 A1 | 8/1992 |
| EP | 0561069 A1 | 9/1993 |
| EP | 1321396 | 6/2003 |
| EP | 1462394 A2 | 3/2004 |
| EP | 1550610 A1 | 7/2005 |
| EP | 1180487 A1 | 8/2006 |
| EP | 1462394 | 8/2006 |
| EP | 2103556 A1 | 9/2009 |
| FR | 1441128 | 4/1966 |
| FR | 2861714 | 11/2003 |
| FR | 2899203 A1 | 10/2007 |
| GB | 1214025 | 11/1970 |
| GB | 2003818 | 3/1979 |
| GB | 2066201 A | 7/1981 |
| JP | H02215618 | 8/1990 |
| JP | 06115696 A | 4/1994 |
| JP | H0767417 | 3/1995 |

(56) References Cited

FOREIGN PATENT DOCUMENTS

| NL | 1018885 | 9/2001 |
|---|---|---|
| WO | 2010/047595 A1 | 4/2010 |
| WO | 2010059923 A1 | 5/2010 |
| WO | 2010086292 A1 | 8/2010 |

OTHER PUBLICATIONS

Commonly assigned co-pending U.S. Appl. No. 14/412,341, filed Dec. 31, 2014.
Commonly assigned co-pending U.S. Appl. No. 14/412,378, filed Dec. 31, 2014.
English translation of International Preliminary Report on Patentability from corresponding International Application PCT/EP2013/063342, dated Jan. 6, 2015.

* cited by examiner

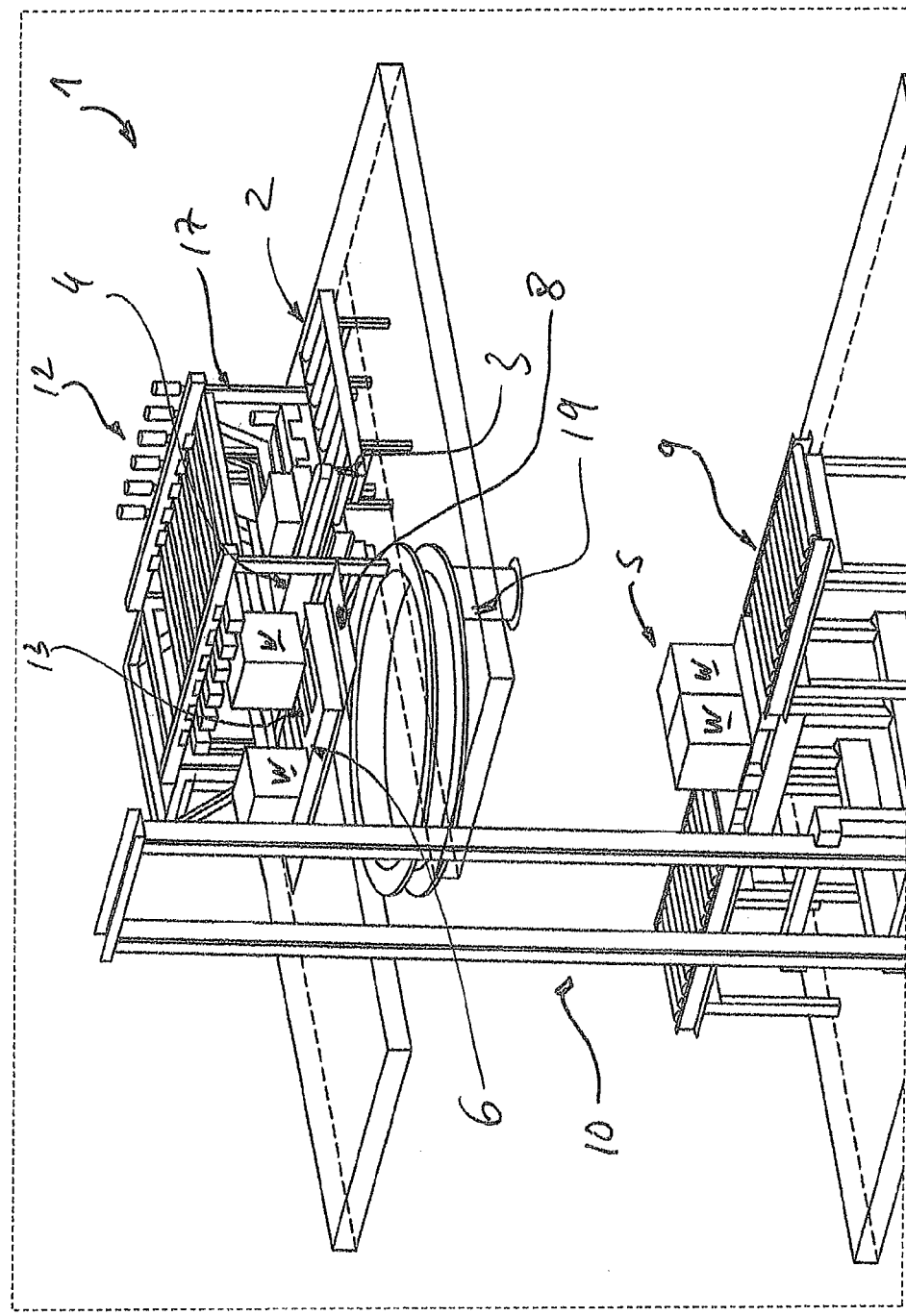

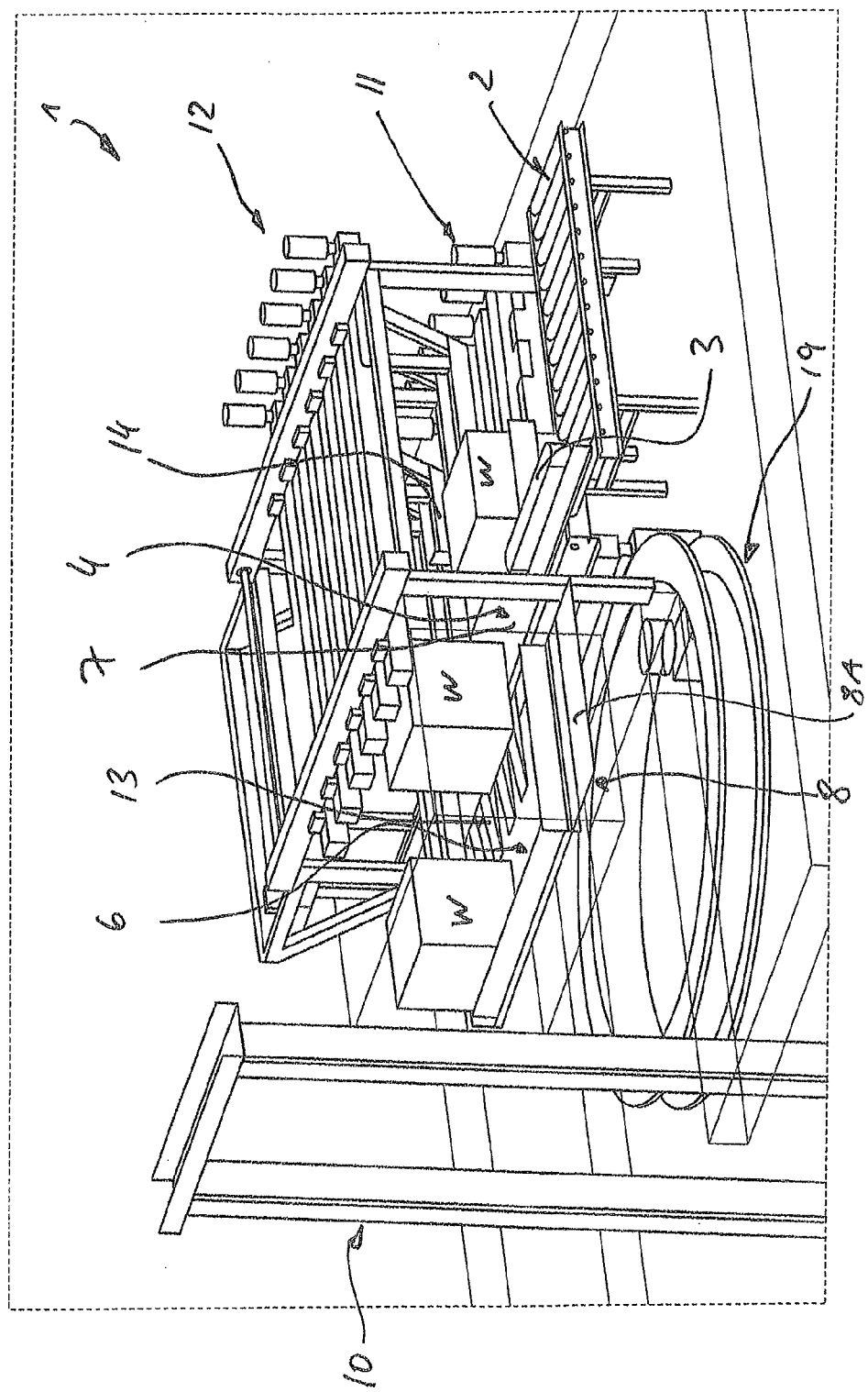

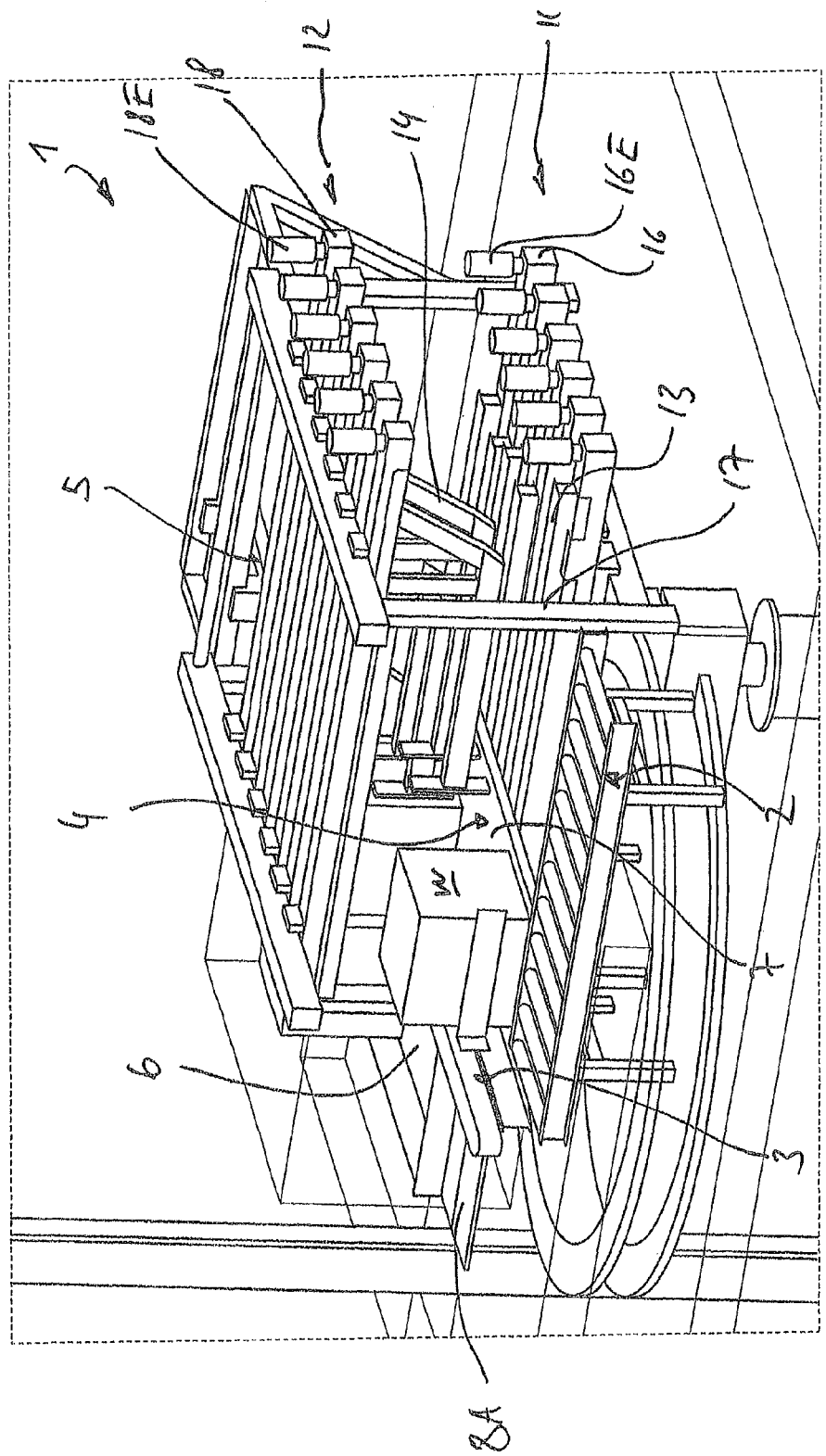

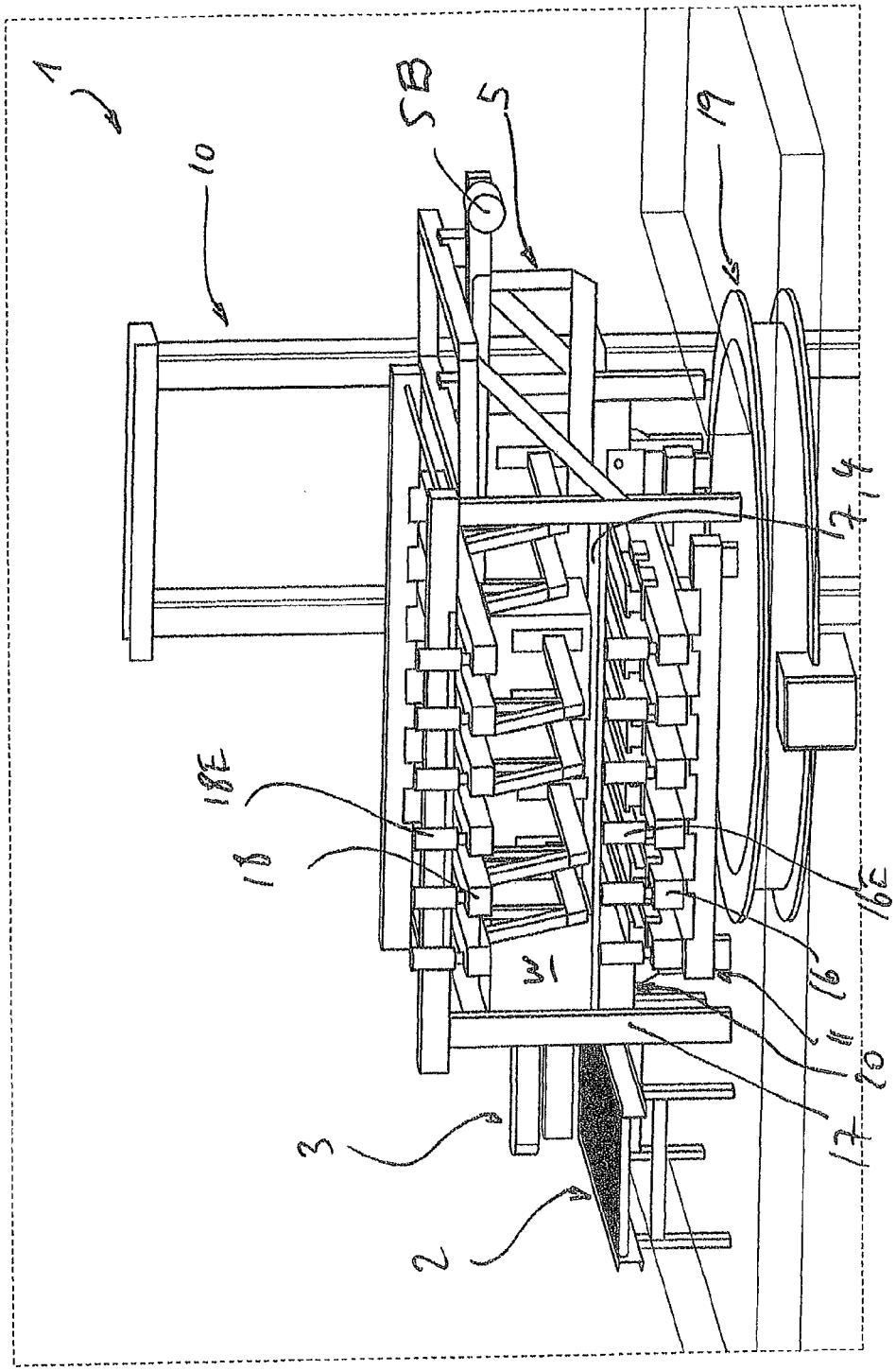

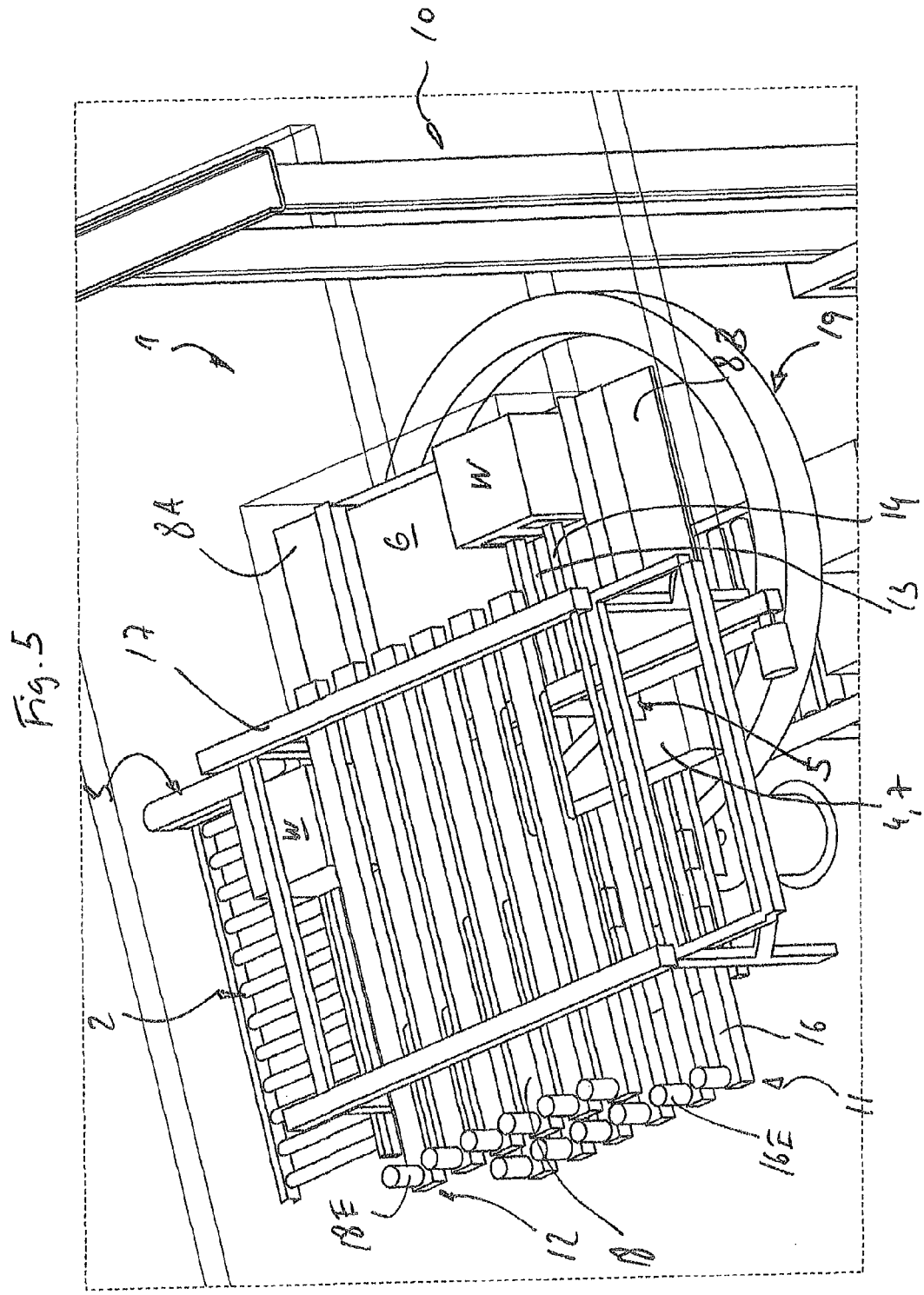

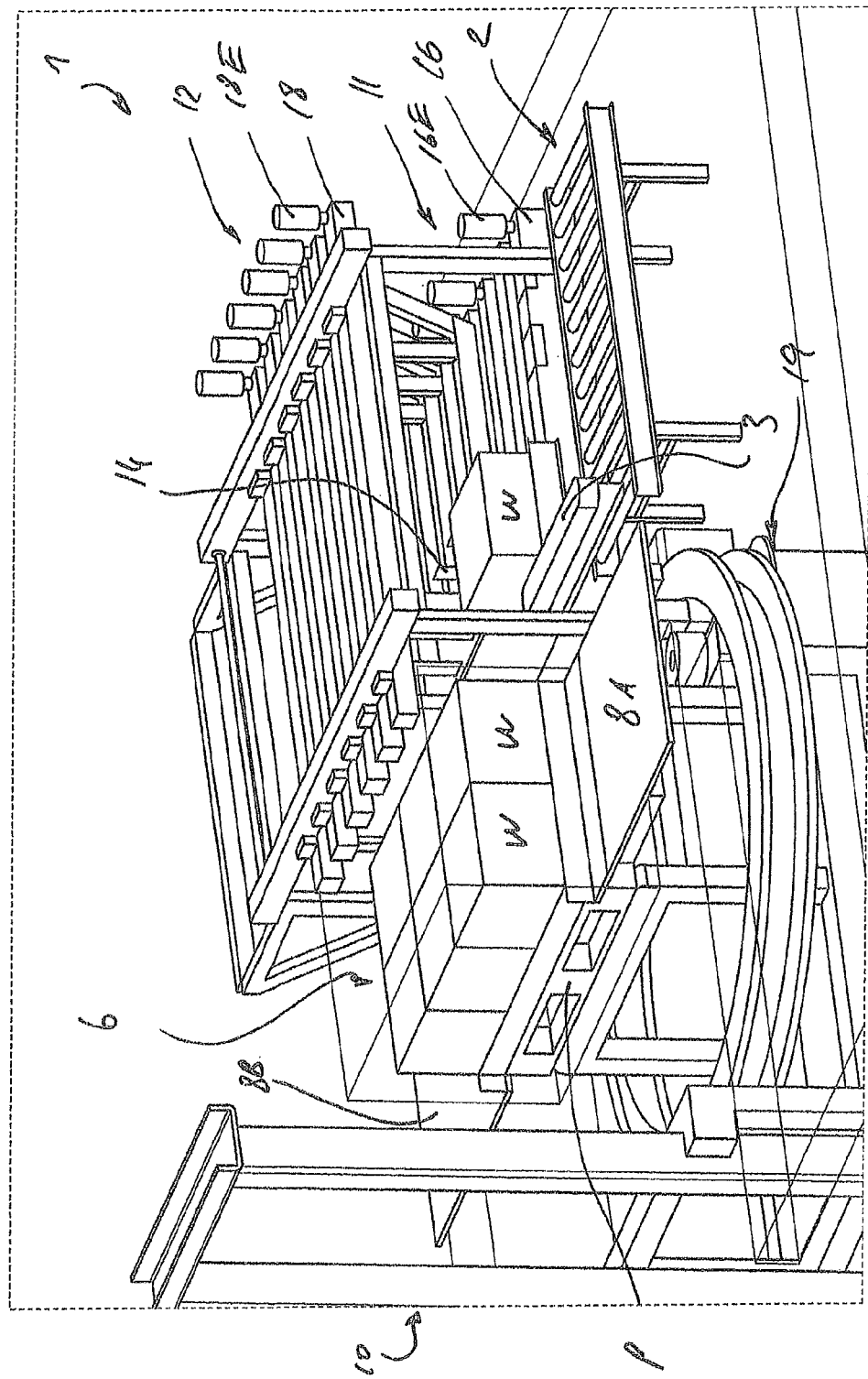

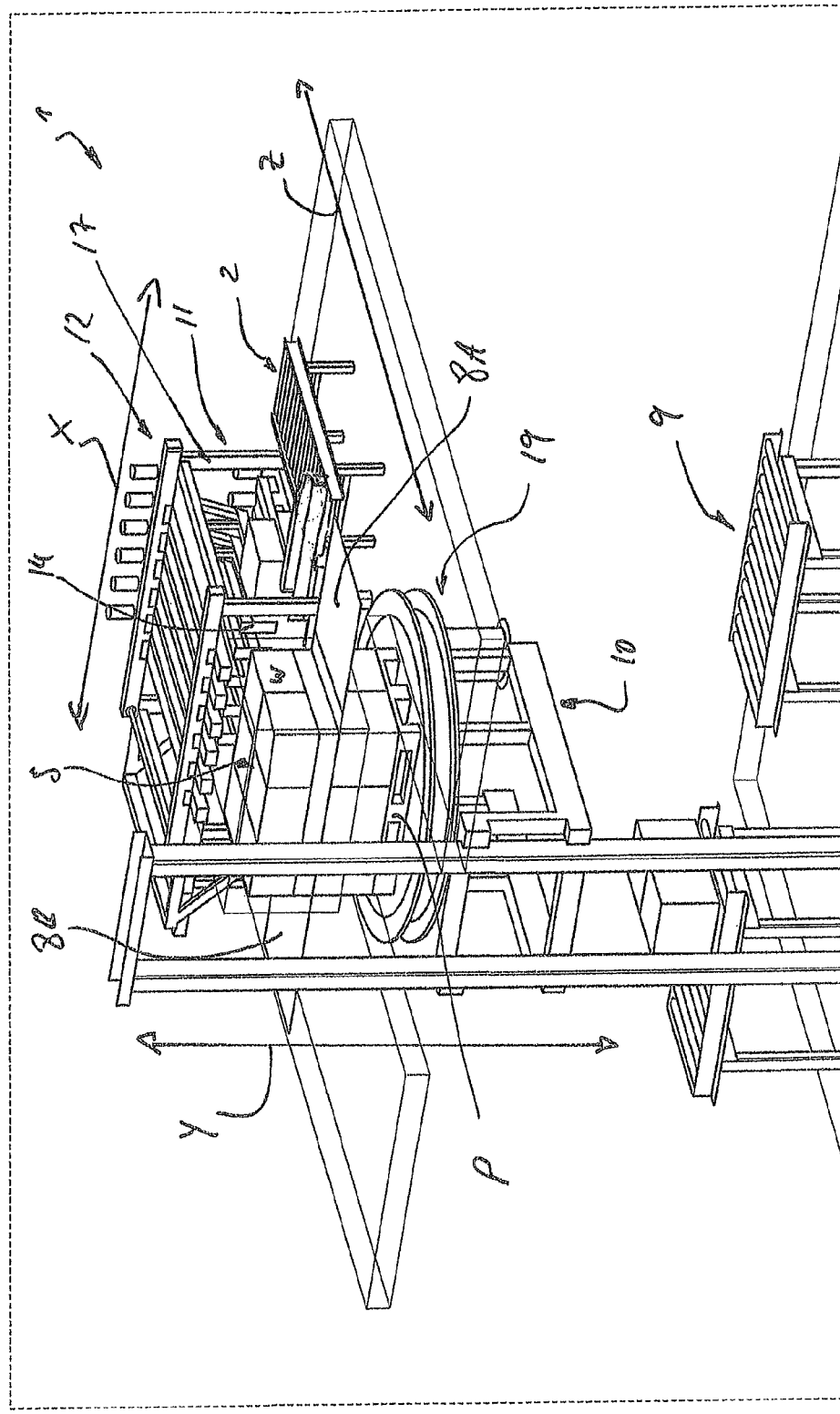

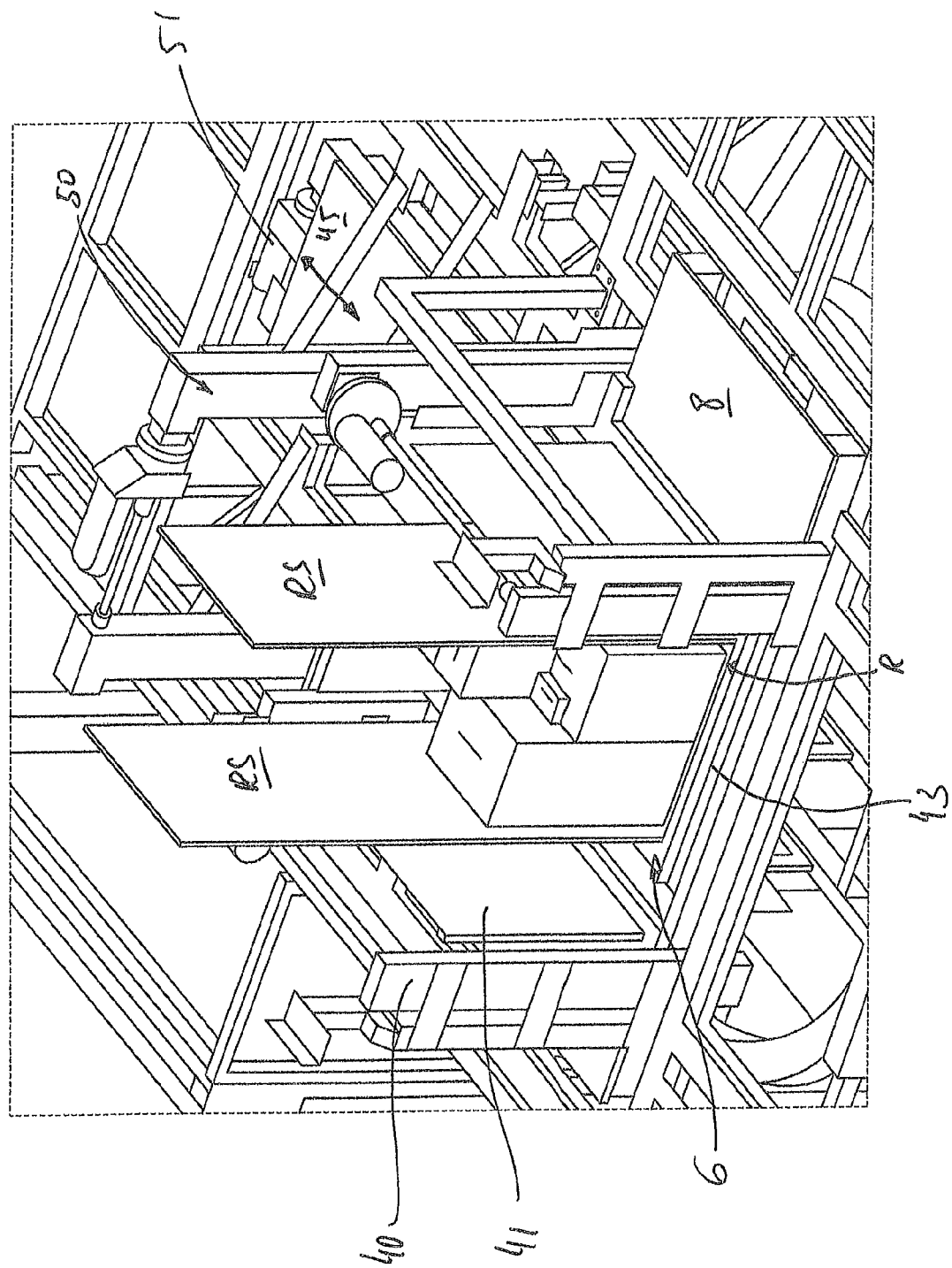

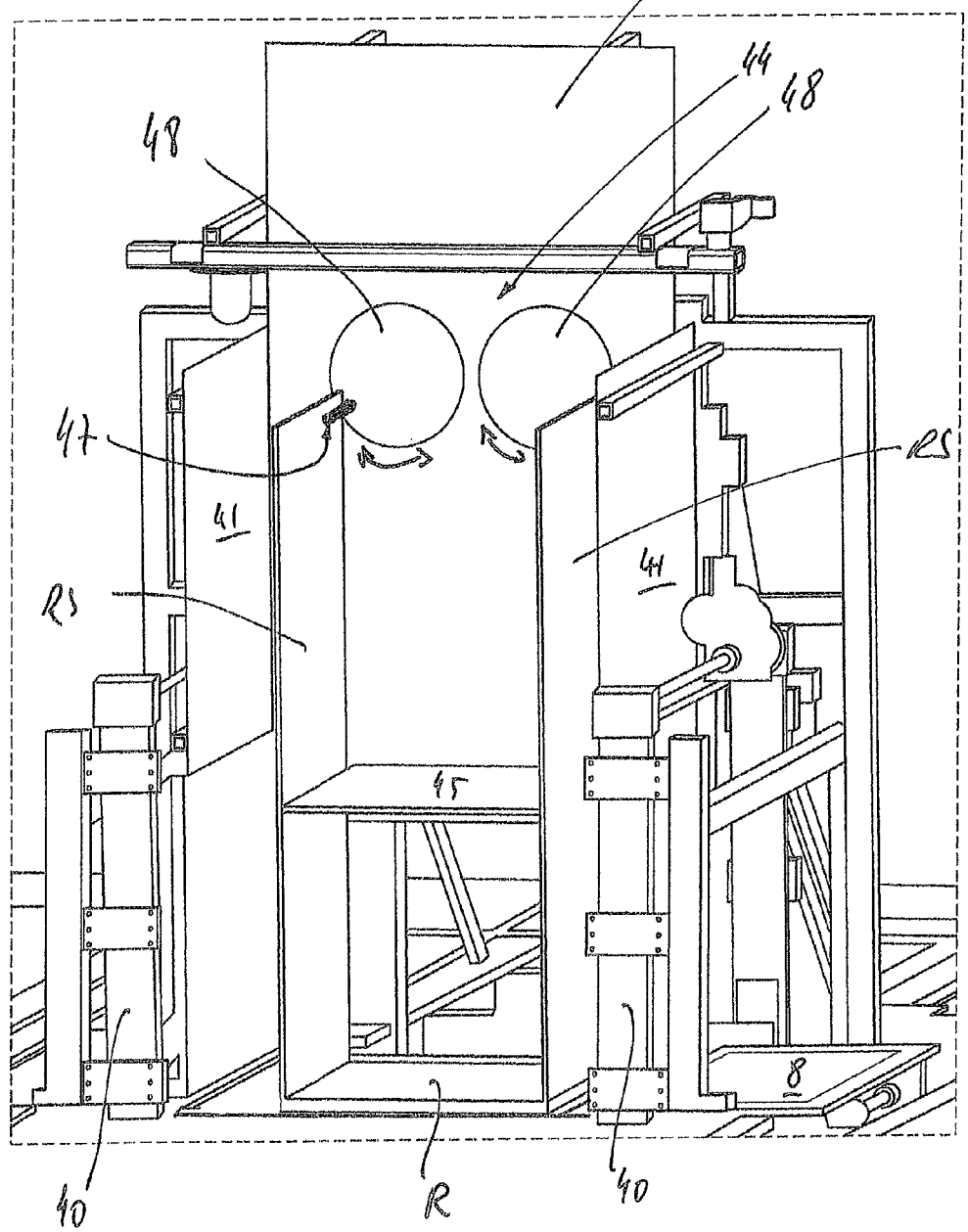

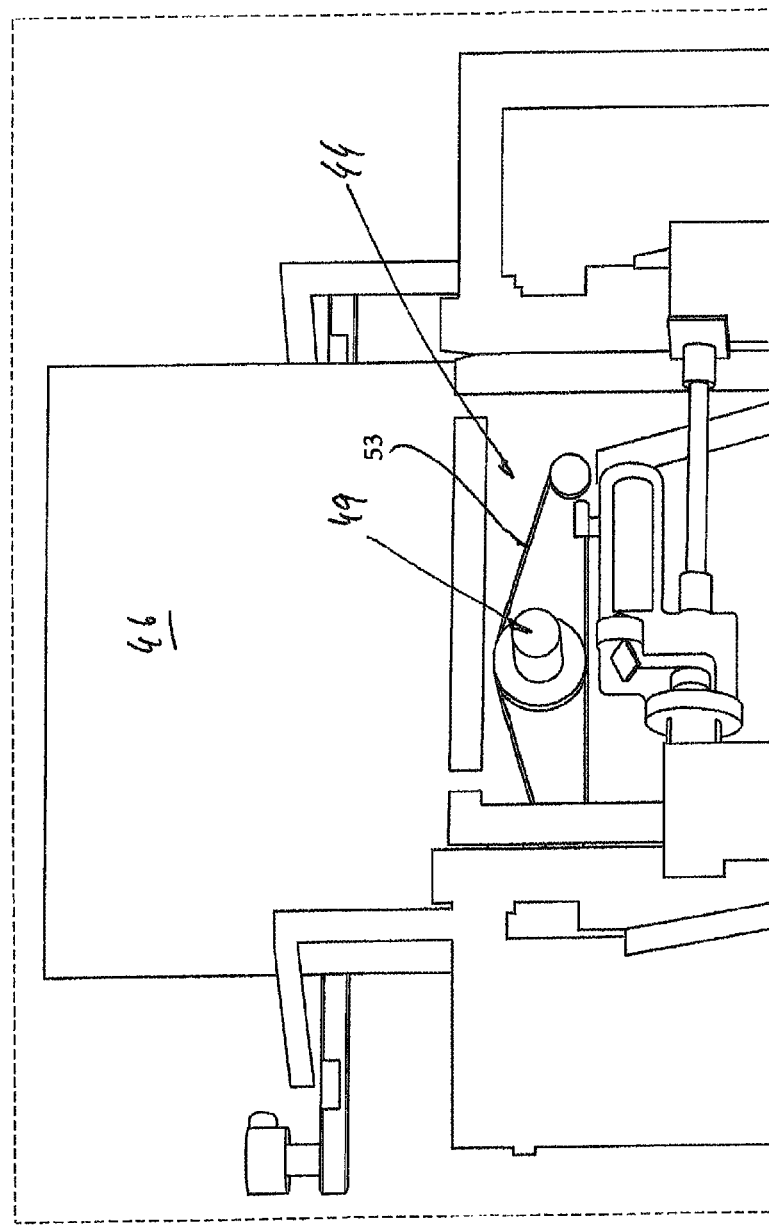

DEVICE AND METHOD FOR LAYERED STACKING A SUPPORT

CROSS REFERENCE TO RELATED APPLICATION

The present application claims the priority benefits of International Patent Application No. PCT/EP2013/063342, filed on Jun. 26, 2013, and claims benefit of DE 10 2012 106 112.2, filed on Jul. 6, 2012.

BACKGROUND OF THE INVENTION

The invention relates to a device for automatically stacking packages on a support in a predetermined spatial arrangement to form a stack.

Automatic stacking of a support or a carrier, in particular a pallet or a trolley, with packages to form a stack for subsequent shipment, i.e. "palletizing" is known per se. However, in that case packages of uniform size or dimension are placed by robots, grabbers etc. into arithmetically determined locations.

In contrast, the process of automatically loading a load carrier with packages of different characteristics to form a stack is the so-called automatic "mixed-case" palletizing.

Current distribution logistics place ever increasing demands upon picking. Therefore, it is necessary to develop picking systems which process orders automatically without manual intervention.

Thousands of different products (or packages) of the most varied characteristics (size, shape, weight, dimensions, surfaces, solidity etc.) must be picked automatically in such systems.

In that case, it is necessary to take into account various aspects which enormously increase the complexity in comparison with "simple" manual stacking of simple, regular geometries. For instance, a subsequent package can only be stacked or placed effectively onto a preceding package if the latter comprises a flat or planar surface which should also be oriented approximately in a horizontal manner, and if the package can support the weight of the further packages, which are placed thereon, without being damaged.

Furthermore, the stack which is formed should comprise a certain level of stability, inter alia to ensure that it does not fall over during transportation. Although a film wrapping helps, it cannot stabilize an incorrectly formed stack on its own.

Furthermore, customers demand with increasing frequency that the stacks are optimized by reason of the desired unloading sequence.

Therefore, different packages or goods of a different size or dimension are generally still stacked manually, as the requirements placed on the stability of the stack, the packing density within the stack and the sequence of loading and the resulting unloading sequence and not least the stacking capability of the goods are extremely high and to date have not been fulfilled or have only been partly fulfilled by the known methods and devices.

EP 1 462 394 B1 discloses a device for automatically loading a load carrier with packing units which form a stack, i.e. a device for palletizing. In the case of the device, the packing units are fed lying supported and individually on trays from where they are placed onto a packing table. At this location, the packing unit, lying on the table, is displaced by a pusher along the broad side of the pallet to be loaded until the loading coordinates in the X-direction are reached. Subsequently, a further pusher and a loading tongue simultaneously push the packing unit in the direction of the load depth over the pallet until the loading coordinates in the Z-direction are reached. Subsequently, the loading tongue moves back, wherein the pusher remains stationary and serves as a scraper, so that the packing unit is placed "free-falling" at the desired position on the pallet. The stack which forms is supported by a loading aid on the remaining three sides. Stacking thus occurs as it were "against the wall". However, the displacement on the packing table is time consuming and owing to the restricted accessibility has disadvantages when forming the packing patterns. Moreover, it is vital that the loading tongue and the scraper/pusher move simultaneously in the X-direction. Also, only one packing unit can ever be "processed" sequentially.

WO 2010/059923 A1 discloses an automatic robot-assisted device for stacking, in which an intermediate plate is used for forming the first tier of a stack and simultaneously changing the pallet.

There is a greater requirement for the stacked packages to be provided in so-called trolleys or rolling containers. They can be loaded easily into trucks and unloaded in situ and moved, as they comprise rollers. Moreover, they comprise sidewalls which permit stable stacking and effective stabilization by means of stretch film, so that transportation is likewise secure. However, these characteristics cause problems during automatic stacking.

SUMMARY OF THE INVENTION

An object of the present invention is to provide a method and a device for automatically stacking packages onto a carrier (trolley) in a predetermined spatial arrangement to form a stack, which method or device permits in a flexible manner mixed-case stacking at a high throughput rate.

Advantageous embodiments are apparent from the claims and the description.

In accordance with an aspect of the invention, it has been recognized that automatic stacking is possible in a reliable manner if the sidewalls of the trolley are held by a spreading device at least perpendicularly or even bent open in a slightly inclined manner outwards. The sidewalls specifically have the characteristic of moving inwardly towards one another.

The spreading device consists preferably of two pins which are arranged at the same height in the region of the expected sidewalls of the trolley, protrude from the sidewall forwardly into the trolley space and can be displaced laterally outwards for spreading purposes. For this purpose, the pins are preferably arranged in each case on a vertically oriented rotary disk in the rear sidewall.

For ease of transportation and handling within the system, the trolleys are moved on transport pallets which can be handled in the same manner as normal pallets.

It has also been found that stacking of trolleys can be facilitated if for this purpose a separate and optionally height-adjustable intermediate plate is provided which is arranged on the side of the stacking location or the carrier remote from the positioning conveyor or can be introduced from this side into the trolley.

If, as in the case of the prior art, an individual pusher is not used but instead the pusher is designed as an arrangement of a plurality of individual pushers arranged horizontally and along the side of the stacking location, i.e. designed as a bank of pushers, which effect pushing of the packages from the positioning conveyor in the direction of the stack, wherein the individual pushers are movable in the Z-direction independently of the at least one sliding plate, in order to retain the package when the sliding plate is being retracted, the packages can still be positioned in a more variable manner and moreover a plurality of packages can be stacked with less of a time offset or even simultaneously.

In a particular variant, not all of the individual pushers comprise a dedicated drive but instead have at least one, preferably two, common drives which can be coupled optionally to a specific individual pusher to drive same. For this purpose, the drive can be movable and can enter into engagement with a drive carriage of the respective (adjacent) pusher(s) via a coupling element.

The individual pushers are thus suspended from a frame, on which they are movable in the Z-direction towards (or away from) the stack. For this purpose, they are approached by a carriage or cross member which is arranged above and extends transversely thereto, i.e. in the X-direction, and supports a drive, wherein a coupling or entraining element establishes the operative connection between the drive and the individual pusher. The entraining element is suspended in the manner of a sheet or strip from the drive or the travelling cross member thereof and engages into a groove, which is open at the top, on the drive carriage of the adjacent individual pusher(s), for which reason the entraining element is of a corresponding width.

Preferably, two such movable common drives are provided, one coming from each side in the X-direction of the frame and one positioned upstream and downstream in the X-direction with respect to the stacking location.

The arrangement of the individual pushers can extend over the entire length of the positioning conveyor, then the individual pushers can be designed to be unmovable in the X-direction or conveying direction of the positioning conveyor. Alternatively, it is also feasible to provide correspondingly fewer individual pushers, but at least two, and then to design same to be adjustable in the X-direction for balancing purposes.

In a preferred embodiment, the at least one sliding plate is designed as a flat, strip-like plate which is designed to be movable horizontally and along the side of the stacking location and transversely thereto and which becomes thinner in the direction of the stacking location. The sliding plate is suspended on the side of the positioning conveyor opposite the carrier. At this location, it is optionally attached to the same frame as the individual pushers. If more than one sliding plate is present, they can be arranged in parallel and next to one another.

It is preferred if the at least one sliding plate is movable back and forth in the manner of a carriage in each case on a linear axle oriented in the Z-direction. Therefore, it can be extended or retracted in simple manner into the required Z-direction towards the stack and is still rigid enough by reason of the long bearing surface or number of bearing points. The drive can be effected e.g. by means of a toothed belt, toothed rack etc.

It is understood that depending upon the design of the positioning conveyor the sliding plate engages underneath or through the positioning conveyor, in order to position a package on the other side in the stack.

It is also possible to design the at least one sliding plate to be movable in the longitudinal direction (X-direction) of the positioning conveyor, in particular if only one or a few, preferably two, sliding plates are provided. Then, they can be movable jointly or independently of one another. If they are movable independently of one another, a plurality of packages can be displaced simultaneously onto the support or into the stack.

Alternatively, in accordance with the number of individual pushers, it is also possible to distribute a corresponding number of sliding plates uniformly over the length of the positioning conveyor. Then, adjustability in the X-direction is not required. Each sliding plate is then preferably "allocated" to an individual pusher and is arranged with the individual pusher in a vertical plane, i.e. arranged flush one on top of the other as seen from above. The sliding plates can likewise be designed with common drives in a similar manner to the individual pushers (see above).

It is likewise possible to control selected individual pushers jointly, so that e.g. two to four adjacent individual pushers move one relatively large package together at the same time. Accordingly, the sliding plates can also be controlled jointly.

In order to provide a structurally simple and non-obstructive suspension, it is expedient if the arrangement of the individual pushers is fastened to a frame extending above the positioning conveyor. The frame rests preferably on rail-like profiles and also serves as a support or suspension for the sliding plates. Therefore, the frame, together with the arrangement of the individual pushers and the sliding plates, forms a modular pusher/sliding plate unit.

In the case of highly complex automatic systems and procedures such as this, all manner of planning cannot prevent the occurrence of malfunctions, e.g. because a package falls over during stacking. Then, an operator is required to intervene manually. In one embodiment, in order to permit or facilitate the intervention of an operator, it is thus provided that the frame, together with the unit consisting of the pusher and sliding plates, is movable away from the stacking location, which can be effected manually or in a driven manner. For this purpose, the unit is preferably displaceable in the manner of a rail, in particular by means of a drive. Preferably, the drive is a spindle which is driven manually or by motor. It is likewise expedient if the positioning conveyor is fastened to the frame, so that the positioning conveyor is likewise "removable". This option of manually overcoming a malfunction or of manually loading increases the availability of the device.

According to the invention, two alternatives are provided for the design of the positioning conveyor. However, it will be understood that any design which permits the packages to adopt the X-position can be used.

If the positioning conveyor is formed as an endless conveyor, it is possible to achieve a high level of efficiency by means of the endless conveyor and also to handle the packages securely. In so doing, a plurality of packages can be transported and displaced simultaneously. In addition, construction and control are both simple.

An endless conveyor is in the present case understood to be a conveyor in which an endless belt circulates and forms a uniform surface. Endless conveyors considered in terms of the invention include band conveyors, belt conveyors, carrying-chain conveyors, apron conveyors and slat conveyors.

The at least one sliding plate then preferably engages through between the upper run, i.e. the upper portion on which conveying takes place, and the lower run, i.e. the lower, returning portion, of the endless conveyor so that a particularly compact construction is achieved.

If a stop, which can move in the X-direction and optionally in the Z-direction, for the packages arranged on the endless conveyor is disposed above the endless conveyor for the purpose of fine positioning in the X-direction, the packages can be positioned in a particularly easy and precise manner. Depending on the design of the surface of the endless conveyor, the conveyor does not even need to be stopped but can continue to run while the packages "slide" on its surface.

It is also possible to use stop blades on the endless conveyor, particularly on the upper side of the upper run, in order to position the packages precisely. The positioning conveyor could then optionally be operated in reverse so that the stop blades do not have to circulate. If sufficient space is provided, the stop blades could also circulate.

Alternatively, the positioning conveyor is designed as a transfer cart or shuttle which can travel back and forth on rails arranged in the X-direction along the stacking location or the support for it and transports in each case one package to the designated X-position.

Preferably, the transfer car is designed having a C-shaped frame, so that the at least one sliding plate can engage through between the limbs of the "C", so as to prevent any mutual hindrance. This also renders it possible that once the "transfer" of the package to the sliding plate has been effected, the transfer car already travels back to receive the next package from the feeding conveyor before the stacking procedure is completed. The actual carrier surface for the package is thus fastened only on one side to the travelling mechanism of the transfer cart and protrudes at this location.

In order to ensure that the packages do not fall down from the transfer cart and are precisely positioned, the transfer cart comprises a stop on the side facing away from the feeding conveyor in the X-direction. In a particularly preferred embodiment, the stop is movable, preferably foldable or pivotable, away from the stop position, so that after "transfer" of the package to the sliding plate has been effected (cf. above), the transfer cart is already able to "fetch" the next package.

For instance, the stop is designed to be movable away from the stop position. For this purpose, the stop can preferably be pivoted about an axis from the stop position to a release position. This embodiment does not require much space and also does not "collide" with the sliding plates. It is expedient if the stop comprises two stop wings which are pivotable in opposite directions, in order to provide a broad stop or surface.

A shifter for the packages can be arranged between the feeding conveyor and the positioning conveyor. It can be designed as a pusher. It is possible for the pusher, together with the transfer cart, to transport the package to the desired X-position, so that the package is transported virtually "clamped" between the pusher and lateral stop of the transfer cart. Therefore, high accelerations and speeds can be achieved during positioning without the risk of packages being displaced, falling down etc.

Therefore, in one variant the pusher (shifter) is movably suspended and driven on a rail which extends along the carrier and runs in parallel with the positioning conveyor.

However, it is also feasible for the feeding conveyor to place the packages directly onto the positioning conveyor without the interposition of a shifter. In one variant, the feeding conveyor terminates for this purpose perpendicularly with respect to the positioning conveyor and "pushes" the packages directly onto the positioning conveyor.

Overall, it is possible in this way to effect stacking of the carrier in a flexible manner and with a high level of efficiency. In particular, a broad spectrum of different packages can be stacked continuously. For instance, in addition to the uniform packages which are not very awkward and can likewise be handled as a matter of course, packages having the most varied dimensions can be stacked consecutively onto the carrier.

The packages can be the most varied goods, such as packaged goods, goods packaged in groups, such as cardboard boxes, crates, containers, goods on trays, packing units, such as film-wrapped multipacks of plastic bottles etc., as well as individual articles of any type.

A feeding conveyor is understood to be conveyors in general and in particular roller conveyors, conveyor belts and conveyor systems. They can be loaded manually or automatically. The packages are singulated and delivered in the correct sequence for the desired packing sequence on the conveyor equipment. The correct sequence is determined arithmetically as an order is being processed. Corresponding software for this purpose is known. The special feature resides in the fact that the packages are delivered on the feeding conveyor without any auxiliary means, such as trays, containers etc.

The packages are thus delivered in singulated fashion. However, it is also possible to arrange groups of identical or very similar packed or unpacked items for collective handling. This grouping is then effected either in the region where the packages are received from the feeding conveyor by the displacement means or even when the feeding conveyor is being loaded. The particular design of the pusher as a bank makes it possible specifically for packages such as these to be transferred or positioned together.

It is also favorable if the packages are oriented before being received by the displacement means. This allows the packages to be received by the displacement means in standardized and thus simplified manner. Alternatively or in addition, corresponding optical methods for detecting the orientation of the packages and controlling the displacement means can also be used, in order to achieve the orientation therewith. The orientation can be effected e.g. by means of the shifter. The movable stop can also be used for orienting purposes.

It is expedient if the stack on the carrier is stabilized during and/or after stacking. Therefore, the individual layers maintain their structure and the stacked support can be transported more securely.

In order to stabilize the stack after stacking (complete stack or individual layers), the stack can be stabilized together with the stacked trolley by having a film, net or the like wrapped around it. Wrapping can be performed in layers gradually during stacking or after stacking of one layer. In this case, stabilization takes place within the actual stacking device. The already partially stacked trolley is lowered by the depth of a layer in order to adapt the level for stacking purposes. This is utilized because already formed layers of the stack can "slide downwards" and be wrapped in layers below the stacking level while "at the top" stacking continues. This saves time. For this purpose, a film wrapping device is integrated directly into the device. This has the advantage that the trolley with a formed stack does not have to be moved separately. For instance, stabilization can be effected each time a tier or layer has been lowered. As a result, it is possible to achieve a high level of stability in the stack even when the trolleys have not actually been stacked in a completely stable manner. This also greatly expands stack-forming options in terms of the goods and selectable sequence.

Of course, as an alternative to the film-wrapping technique all other known stabilization options can be used. This includes e.g. shrink-wraps, nets and other stretchable materials as well as hook-and-loop fasteners and adhesive connection means etc.

During actual stacking, stabilization can be effected by means of lateral walls arranged in a U-shaped manner around the stacking location or trolley, so that stacking can be performed "against the wall". The sidewalls and the rear sidewall can be adjusted or moved vertically and/or horizontally in relation to the stacking location. Therefore, carriers etc. of a different size can be loaded and the walls can serve as a scraper in conjunction with intermediate plates.

Depending upon the packages to be stacked, it may be necessary for the purpose of protecting the packages or for increasing the stacking capability etc. to place inserts, e.g. consisting of cardboard or paperboard, between, below or above the layers. For this purpose, the flat material can be appropriately stocked and/or delivered and can be placed by means of suckers provided on the handling means.

The trolleys and also the inserts (cardboard) can be delivered and presented by means of separate conveying equipment. The carriers or inserts can be received or transferred using dedicated equipment.

In one embodiment, it is arranged that an intermediate plate is provided at the level of the positioning conveyor above the trolley to be loaded. The intermediate plate provides a uniform smooth surface for forming a stack and permits further stacking in spite of any change of carrier or support.

The intermediate plate is divided preferably in the middle and each part is designed to be displaceable towards the side.

In one variant, the first tier of a stack is formed on the intermediate plate, while the completely loaded trolley from the preceding stacking procedure underneath it is swapped for a new empty support. Therefore, the stacking procedure can be continued without interruption. If the first layer is formed and the new support is present, the parts are moved to the side and the first layer is transferred in this manner onto the underlying carrier, on which stacking subsequently continues. This embodiment is particularly suitable for pallets etc.

When the intermediate plate is moved apart or opened, the lateral stabilization walls serve as a scraper, i.e. the intermediate plate moves laterally below the lower edges of the walls.

In a preferred alternative, the complete stacking procedure takes place on the intermediate plate which for this purpose is designed to be height-adjustable. This has the advantage that the transfer to the trolley only takes place after stacking and the trolley does not have to be "swapped". As a result, the total throughput rate of the device is increased. Moreover, the optionally provided stretch film-wrapping can be effected more easily.

The rear sidewall can serve as a scraper when the completely stacked stack is transferred to the trolley by retracting the further intermediate plate. In one embodiment, the rear sidewall is also height-adjustable and/or movable in the direction of the positioning conveyor, so that trolleys of a different size can be used.

This preferably also serves as an attachment location for the spreading device.

Therefore, the device in accordance with the invention can be used for stacking pallets etc. or trolleys alternately according to requirement.

Further details of the invention will be apparent from the description hereinafter of exemplified embodiments with reference to the drawings.

BRIEF DESCRIPTION OF THE DRAWINGS

FIG. 1 shows a schematic perspective view of a device for automatic layered stacking at the beginning of the formation of the first layer on a pallet;

FIG. 2 shows an enlarged schematic side view of the device of FIG. 1 in the region of the endless conveyor;

FIG. 3 shows a view corresponding to FIG. 2 from another angle of view;

FIG. 4 shows a view corresponding to FIG. 2 from still another angle of view;

FIG. 5 shows a view corresponding to FIG. 2 from above;

FIG. 6 shows a view corresponding to FIG. 2 after completion of the first layer;

FIG. 7 shows a view corresponding to FIG. 1 after completion of further layers;

FIG. 24 shows a schematic perspective view of the device of FIG. 23 from a different angle of view, wherein the rear stabilisation wall is omitted for improved clarity;

FIG. 25 shows an enlarged view of the device of FIG. 23 during spreading of the trolley side walls and FIG. 26 shows a detailed view of the mechanism for spreading the trolley side walls.

DESCRIPTION OF THE PREFERRED EMBODIMENTS

Figure 8A:
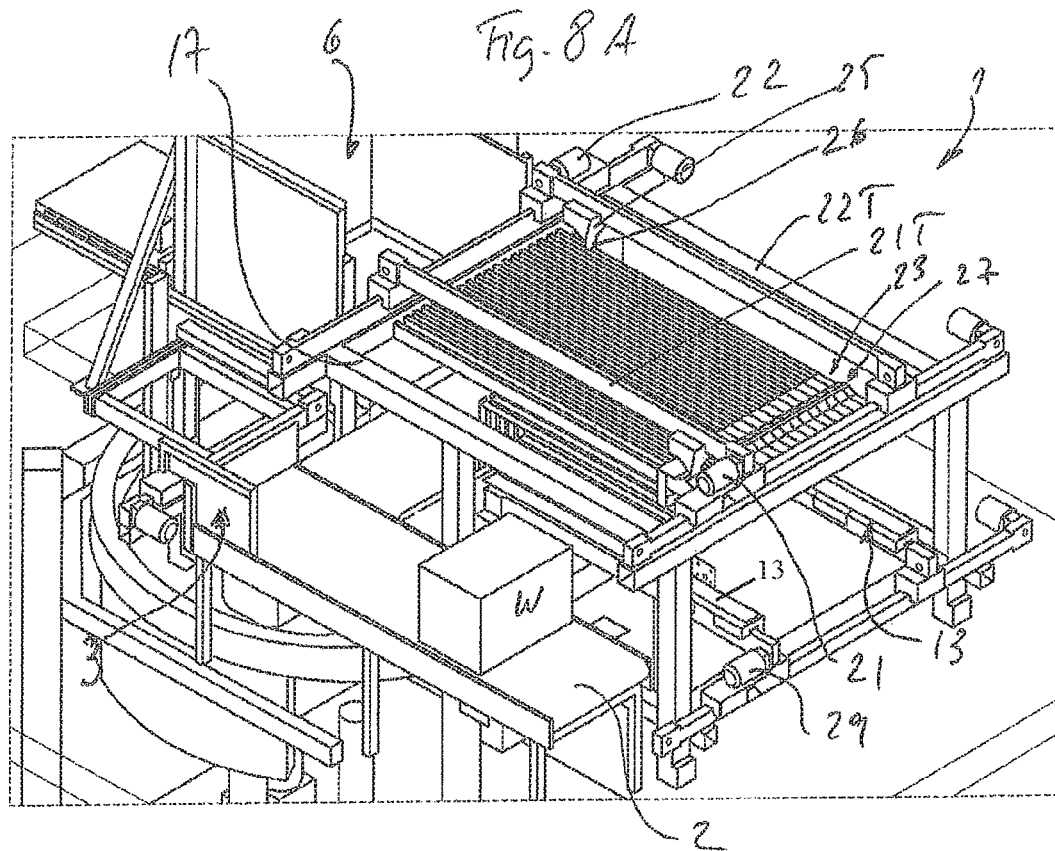
FIG. 8A shows a schematic perspective view of a variant of a device for automatic layered stacking.

FIGS. 1-7 show a device, which is designated as a whole by the reference numeral 1, for automatic layered stacking of pallets P or trolleys R with packages W of different dimensions in a predetermined spatial arrangement. The figures first depict the variant with pallets P.

This is a device for "mixed-case palletizing". Naturally, the device 1 can also be used for palletizing merely similar packages W.

The device 1 comprises a roller conveyor 2 as a feeding conveyor which provides the singulated packages W in a computer-aided predetermined sequence from a warehouse, not shown.

Arranged at the end of the roller conveyor 2 is a shifter which is designed as a pusher 3 and shifts the packages W by 90° and places them onto the subsequent positioning conveyor. The packages W are likewise angularly oriented, so that they are oriented on the positioning conveyor 4 insofar as their outer shape allows.

The positioning conveyor 4 is designed as an endless conveyor in the form of a circulating conveyor belt. It serves to position the packages W, being conveyed in the X-direction, in order to adopt this coordinate of the subsequent position in the stack.

In order to maintain the positioning precisely or to effect positioning when the conveyor belt 4 is running, a stopping device 5 (cf. FIG. 4) is provided which is movably controlled in the X-direction relative to the conveyor belt in order to "hold up" the respective package. The drive is effected by means of a toothed belt (not shown) which is arranged on the linear axle 5B and into which the stopping device 5 is hooked.

The positioning conveyor or the conveyor belt 4 is arranged horizontally (at the same level) and along a side of the location 6 for stack formation. The carrier P (pallet) which is to be loaded will typically be located here (cf. FIGS. 6 and 7).

However, as it is still possible to see, this is not the case when the first layer of a stack is being formed.

At the level of the upper run 7 of the endless conveyor 4 above the carrier P to be loaded, an intermediate plate 8 is provided in the location 6. The intermediate plate 8 is divided in the middle and each part 8A, B is designed to be displaceable towards the side (in the X-direction) such that the first layer of a stack is formed on the intermediate plate 8, whereas the completely loaded carrier P from the preceding stacking procedure underneath it is swapped for a new empty carrier P. Therefore, the stacking procedure can be continued without interruption. If the first layer is formed and the new carrier P is present, the parts 8A, B are moved to the side (cf. FIG. 6) and the first layer is transferred in this manner onto the underlying carrier P, on which stacking subsequently continues (cf. FIG. 7).

In order to feed empty pallets or remove stacked pallets, a corresponding roller conveyor 9 is provided below the stacking location 6.

The respective pallet P is received from the roller conveyor by a lifting and lowering unit 10 for lifting and lowering the carrier P in the Y-direction and is moved upwards to the stacking location 6. The lifting and lowering unit 10 is also responsible per se for adapting the level during stacking, i.e. it performs a lifting or a lowering movement as necessary during stacking of a package W and also performs adaptation of layer balancing at the beginning of a new layer.

The respective package W is thus pushed in the Z-direction by the conveyor belt 4 onto the desired position in the stack laterally into the location 6 onto the intermediate plate 8 (first layer) or the pallet P (further layers).

For the purpose of this displacement of the packages W to the predetermined position in the stack S, the device comprises a sliding plate bank 11 and a pusher bank 12, i.e. in each case a plurality of individual sliding plates 13 and individual pushers 14 arranged next to one another horizontally and along the side of the stacking location 6 or the pallet P.

The sliding plates 13 engage through between the upper run 7 and the lower run 20 of the endless conveyor and receive the package W pushed from the conveyor belt by the pusher 14. Subsequently, the pusher and the sliding plate travel together to the desired position and the sliding plate 13 is retracted, whereas the pusher 14 remains stationary to retain the package W. Therefore, the package W is positioned. The sliding plates 13 become flat at the front (cf. FIG. 2), so that positioning can be effected as precisely as possible.

The sliding plates 13 are each designed as flat, strip-like plates which are movable horizontally and along the side of the stacking location 6 and transversely thereto and which become thinner in the direction of the stacking location 6.

The sliding plates 13 are suspended on the side of the endless conveyor 4 opposite the carrier and are arranged in parallel and next to one another. They are each movable back and forth in the manner of a carriage on a linear axle 16 oriented in the Z-direction. The drive is effected for each axle by means of an electric motor 16E and a toothed belt (not shown) which is arranged on the linear axle and into which the carriage or the sliding plate 13 is hooked.

Therefore, the sliding plate bank 11 forms as it were an optional widening of the endless conveyor 4 into the stacking location 6.

The pushers 14 are arranged along the endless conveyor 4 and flush with one another horizontally and along the side of the stacking location 6 or the carrier P and are designed to be movable independently of one another. They are arranged on the side of the endless conveyor opposite the carrier or are in the rest position at this location, in order to extend over the conveyor belt 4 for the purpose of pushing packages.

The pushers, like the sliding plates, are also arranged over the entire length of the stacking location 6 or the pallet P and are fastened to a frame 17 mounted above the endless conveyor. At this location, they are each movable back and forth in the manner of a carriage on a linear axle 18 oriented in the Z-direction. The drive is effected for each axle by means of an electric motor 18E and a toothed belt (not shown) which is arranged on the linear axle and into which the carriage or the pushers 14 is/are hooked.

The stopping device 5 and also the pushers 14 extend from the respective linear axle downwards to a height only just above the surface of the conveyor belt 4 and comprise at the end at that location a flatly enlarged base for handling the packages W more effectively and more safely.

Provided below the stacking location 6 is a unit 19 for wrapping the formed stack S in a film.

Wrapping is effected in layers gradually during stacking or after stacking of a layer. The carrier P comprising the already formed layers of the stack S is lowered gradually downwards by the lifting and lowering unit 10 and thus travels through the annularly formed unit 19 in order to be wrapped.

If the entire stack S is completed, the stack S is moved downwards on the pallet P and transported away via the roller conveyor 9.

At the same time, the intermediate plate 8 is closed and stacking continues thereon to form the next stack of the next order.

In parallel herewith, as already described above, a new empty pallet P is "loaded".

Overall, in order to automatically stack packages W onto a pallet P in a predetermined spatial arrangement to form a stack S, the sequence and spatial position of the packages W on the pallet P are determined in a computer-aided manner in order to create a stack S using the order forming the basis thereof.

The packages W are then acquired individually without auxiliary means (trays etc.) from a warehouse etc. in a predetermined sequence, which is required for this purpose, by means of the feeding conveyor 2. The packages W to be loaded are then shifted from the feeding conveyor 2 by the shifter 3 onto the endless conveyor 4.

By means of this, the stopping device 5 and the pusher bank 12 and sliding plate bank 11, the respective package W is transported to the predetermined spatial position on the pallet P (or the stacking location 6 or intermediate plate 8) in the stack being formed.

Depending upon requirement, the pallet P is lowered or raised in the Y-direction by the corresponding unit 10.

Figure 8B:
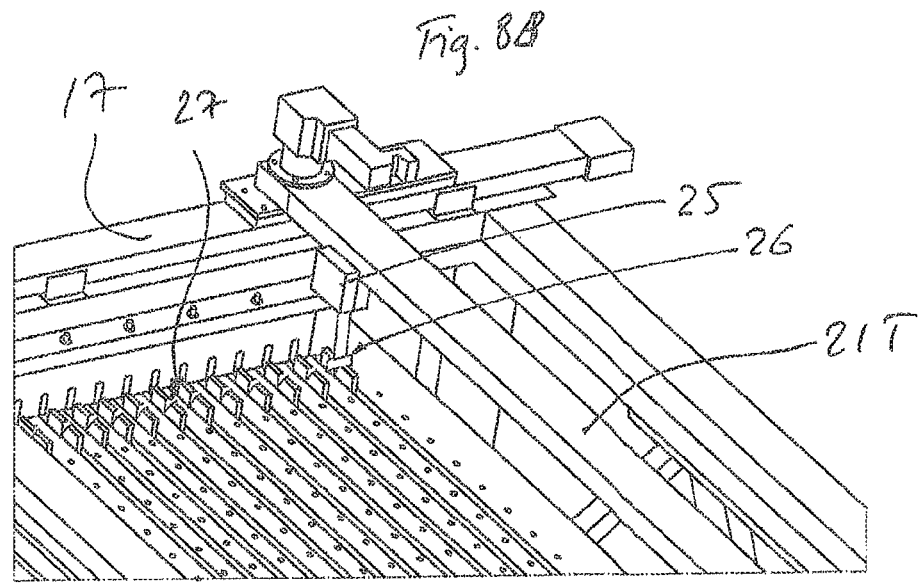
FIG. 8B shows an enlarged detailed view of the common drive of the individual pushers.
Figure 9:
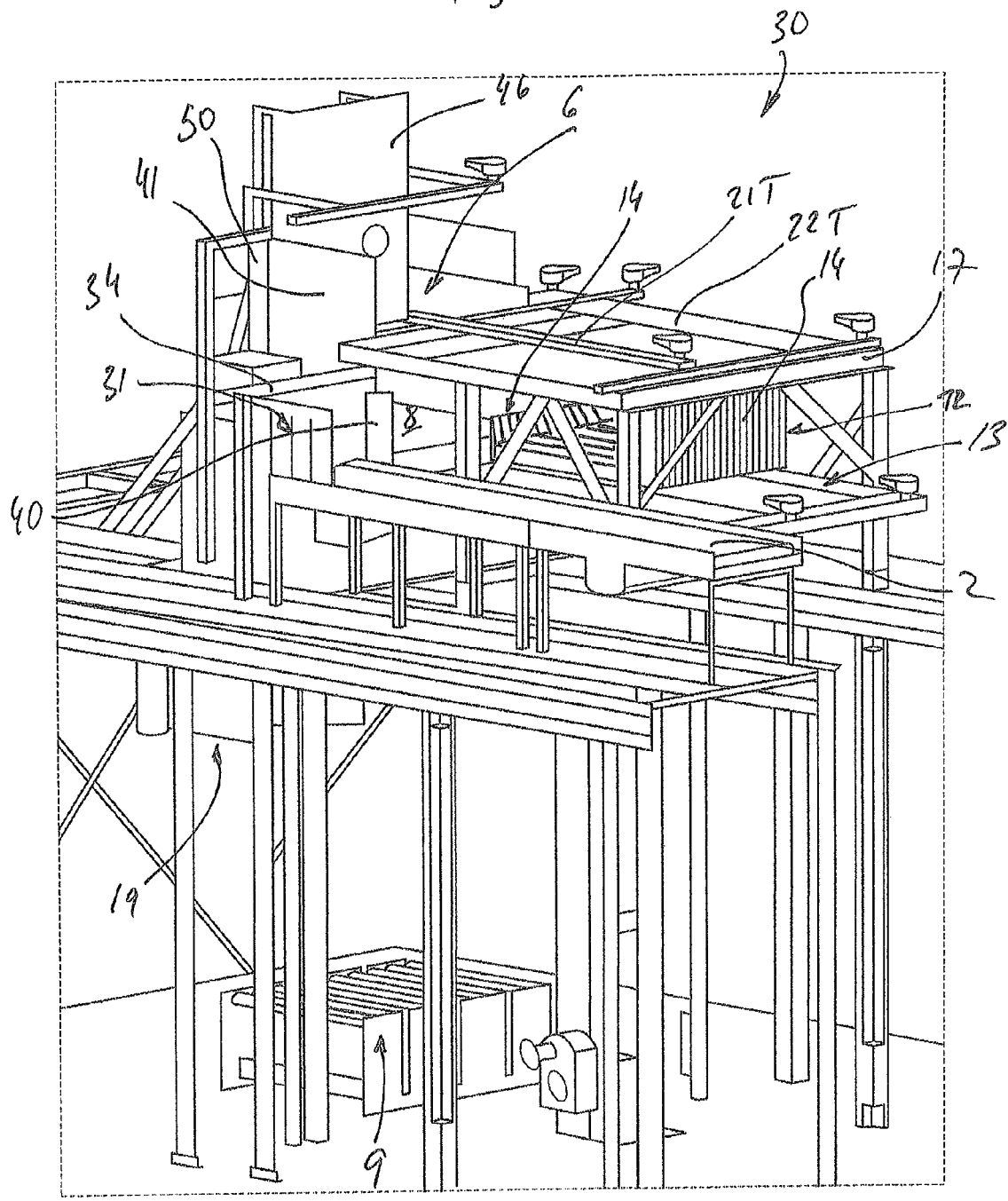
FIG. 9 shows a schematic perspective view from one side of a further device for automatic layered stacking.
Figure 10:
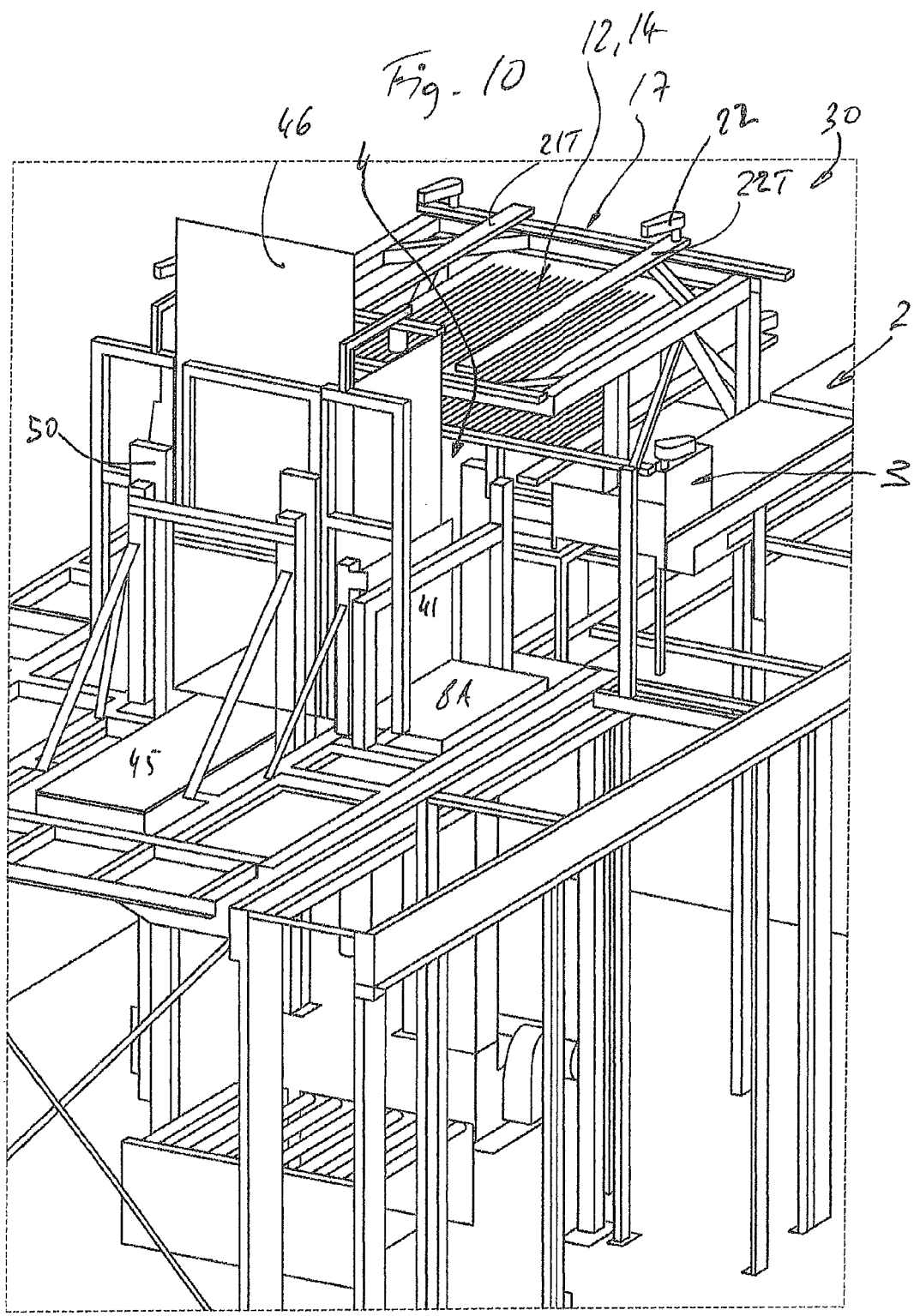
FIG. 10 shows a further schematic perspective view of the device of FIG. 9 from another angle of view.

FIGS. 8A and 8B show an alternative variant of the previously described device which differs therefrom essentially in that the individual pushers of the pusher bank do not each comprise dedicated drives and that no sliding plate bank is provided.

Therefore, only these differences will be discussed hereinafter.

In this variant, the individual pushers comprise two common drives 21, 22 which can be optionally coupled to a specific individual pusher in order to drive same. For this purpose, the drives 21, 22 are movable in the X-direction on the frame 17 above the individual pushers by means of a cross member 21T, 22T and can be coupled to the drive carriage 23 of the individual pushers 14.

The drive 21, 22 comprises in each case an actual drive block 24, 25 which is movable in the Z-direction in a similar manner to the above embodiment of the pushers. In order to drive the respective individual pusher 14, the drive block 24, 25 comprises a coupling lug 26 which points in the direction of the drive carriages 23 and engages into a groove 27, which extends transversely with respect to the X-direction, in the drive carriage 23.

In order to drive a specific individual pusher, the drive 21 or 22, depending upon the individual pusher, is moved by means of the cross member in such a manner that the corresponding coupling lug 26 engages into the groove 27 of the respective drive carriage 23. Subsequently, the drive block 24 or 25 is moved and entrains the drive carriage 23 or the individual pusher 14 in the Z-direction.

The individual pushers are thus suspended from a frame, on which they are movable in the Z-direction towards (or away from) the stack. For this purpose, they are approached by a carriage or cross member which is arranged above and extends transversely thereto, i.e. in the X-direction and supports the drive, wherein a coupling or entraining element establishes the operative connection between the drive and the individual pusher.

This can be better seen in detail in FIG. 8B. It is also apparent that the entraining element (coupling lug 26) is suspended in the manner of a sheet or strip from the drive or its travel cross member 21T, 22T and engages into a groove 27, which is open at the top, on the drive carriage of the adjacent individual pusher(s) 14, for which reason the entraining element 26 is of a corresponding width, so that it can engage by means of corresponding positioning either into the groove 27 of an individual pusher or into the two grooves 27 of adjacent individual pushers 14.

Figure 14:
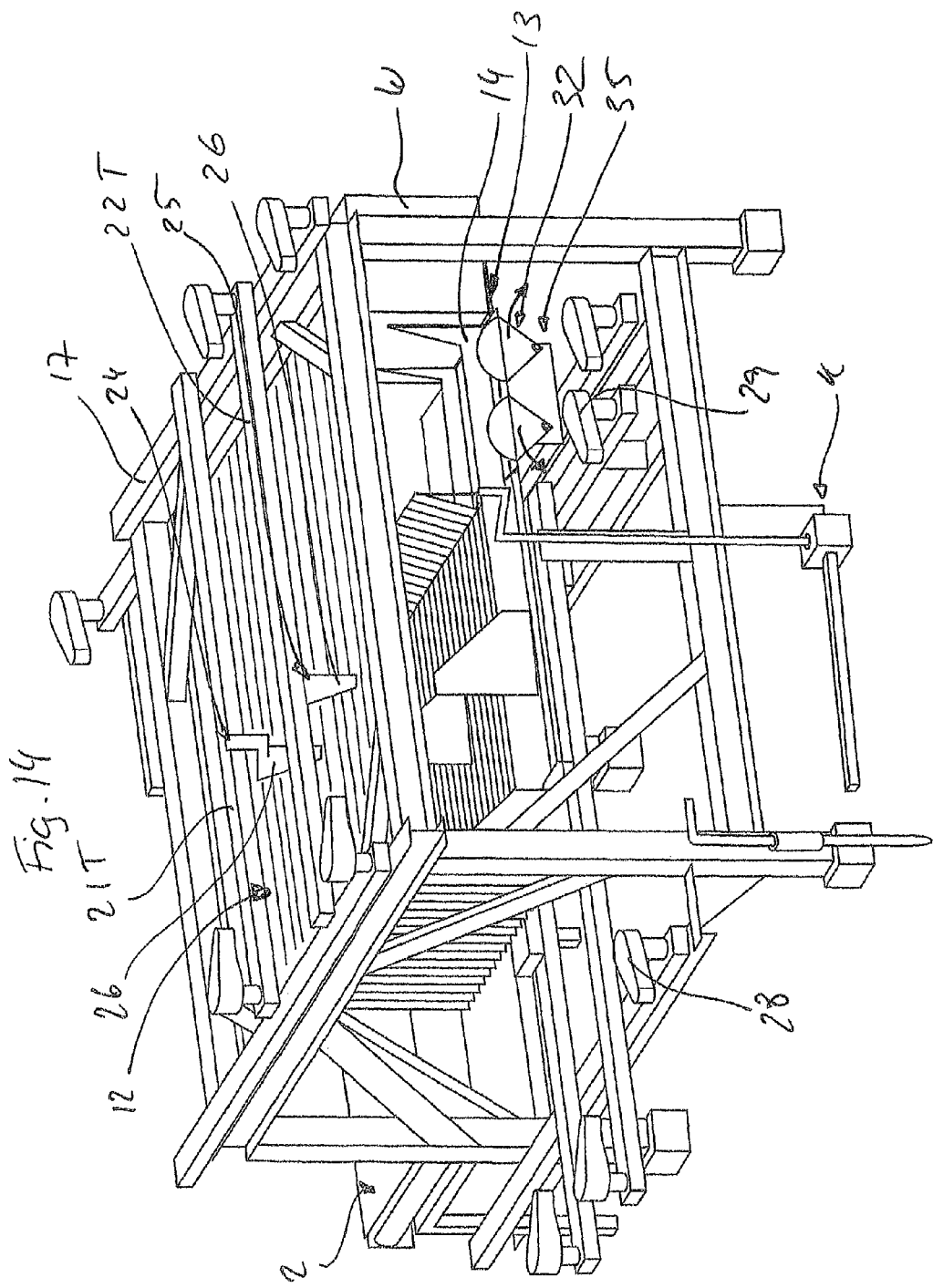
FIG. 14 shows a schematic perspective view of the displacement means of the device of FIG. 9 at the beginning of transportation of the package in the Z-direction from another angle of view.
Figure 15:
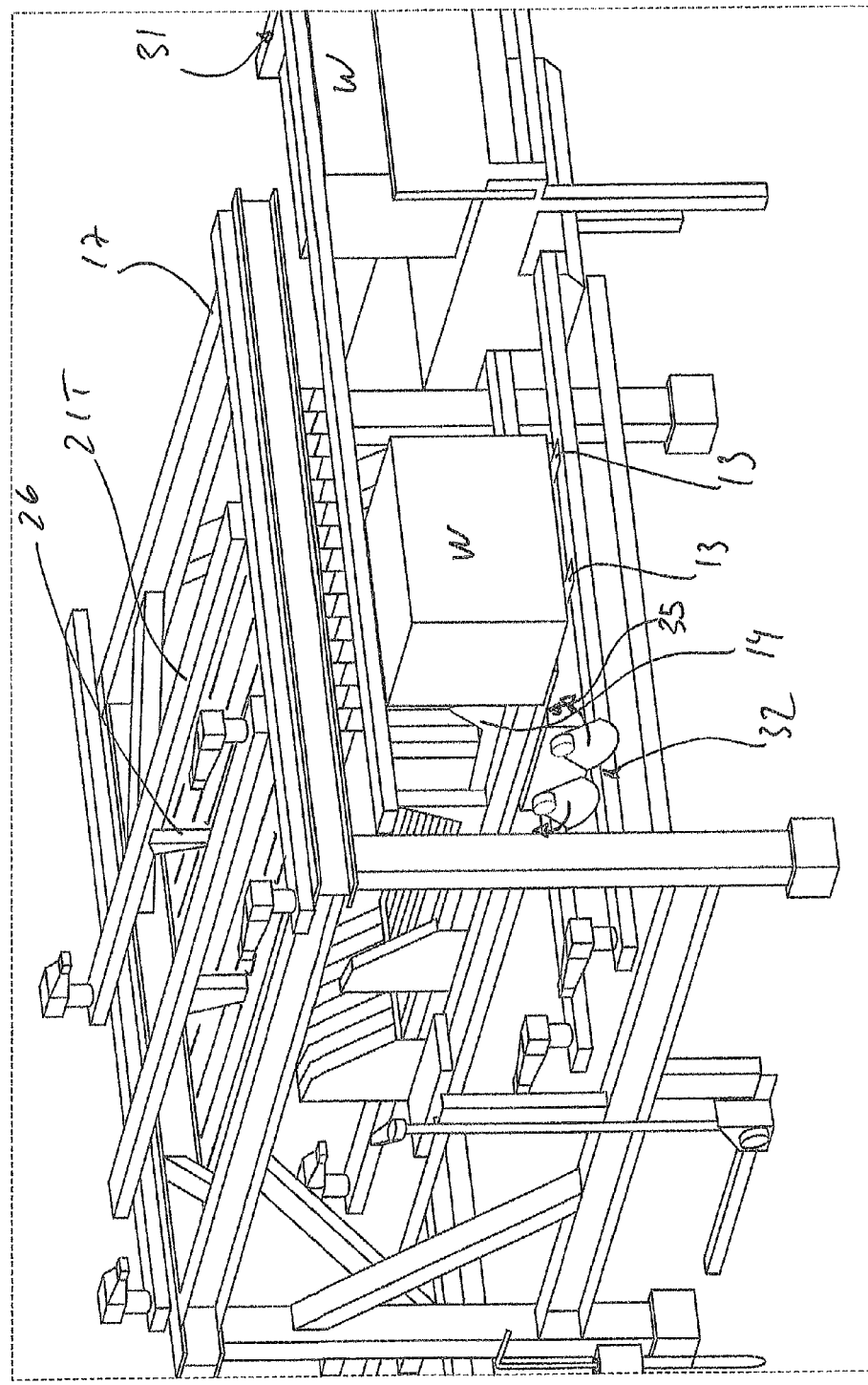
FIG. 15 shows a schematic perspective view of the displacement means of the device of FIG. 9 during further transportation of the package in the Z-direction.
Figure 16:
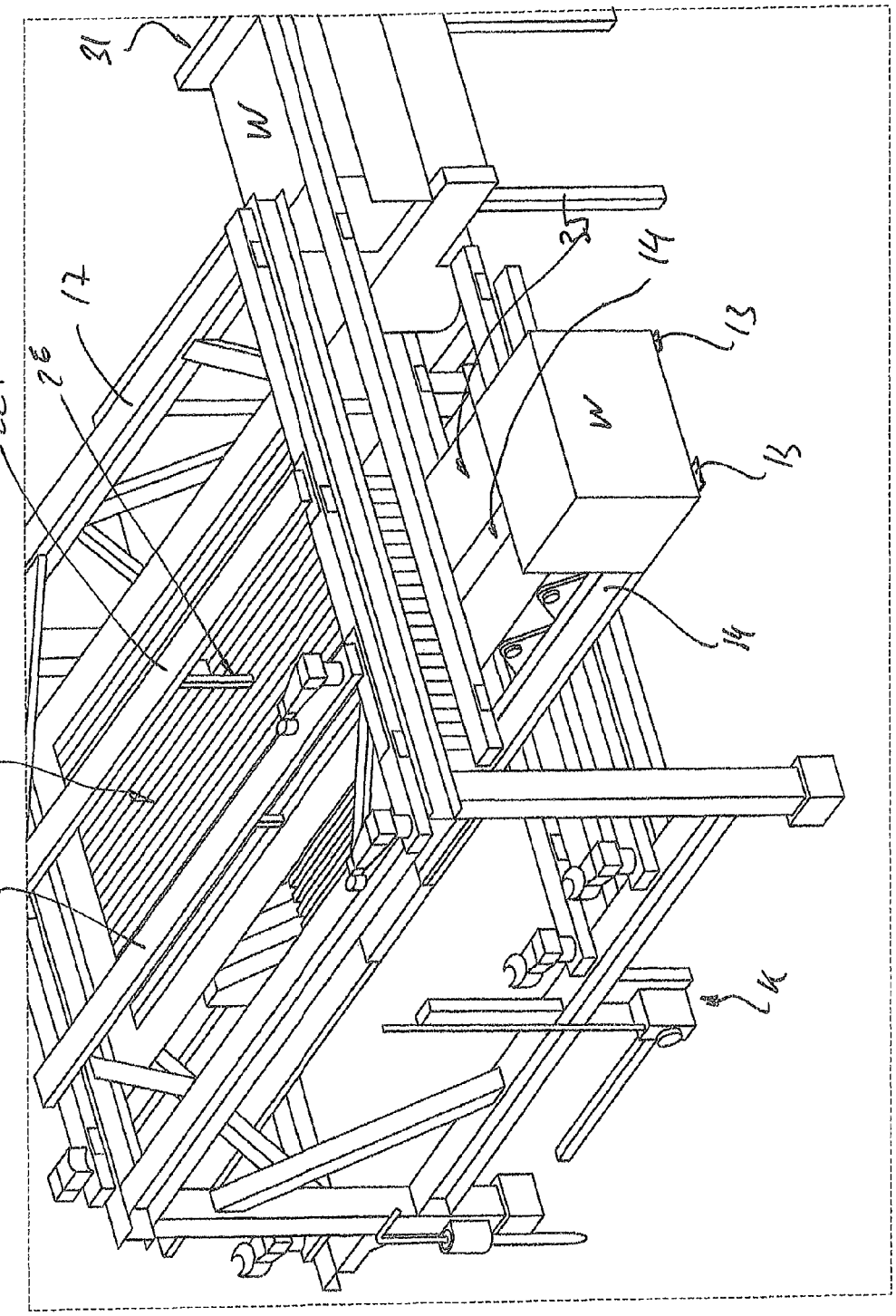
FIG. 16 shows a schematic perspective view of the displacement means of the device of FIG. 9 at the end of transportation of the package in the Z-direction.
Figure 17:
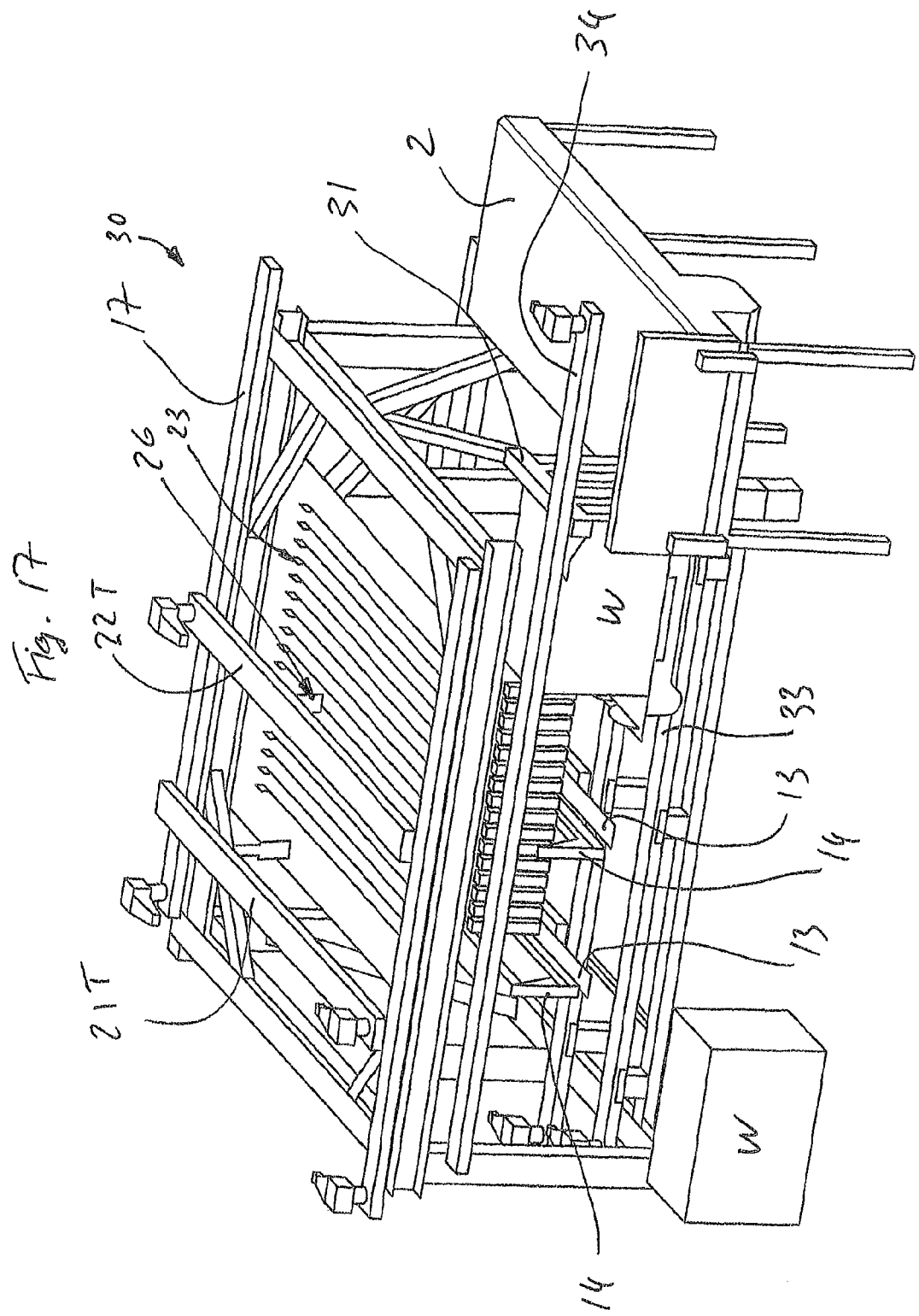
FIG. 17 shows a schematic perspective view of the displacement means of the device of FIG. 9 after transportation of the package in the Z-direction has ended.
Figure 18:
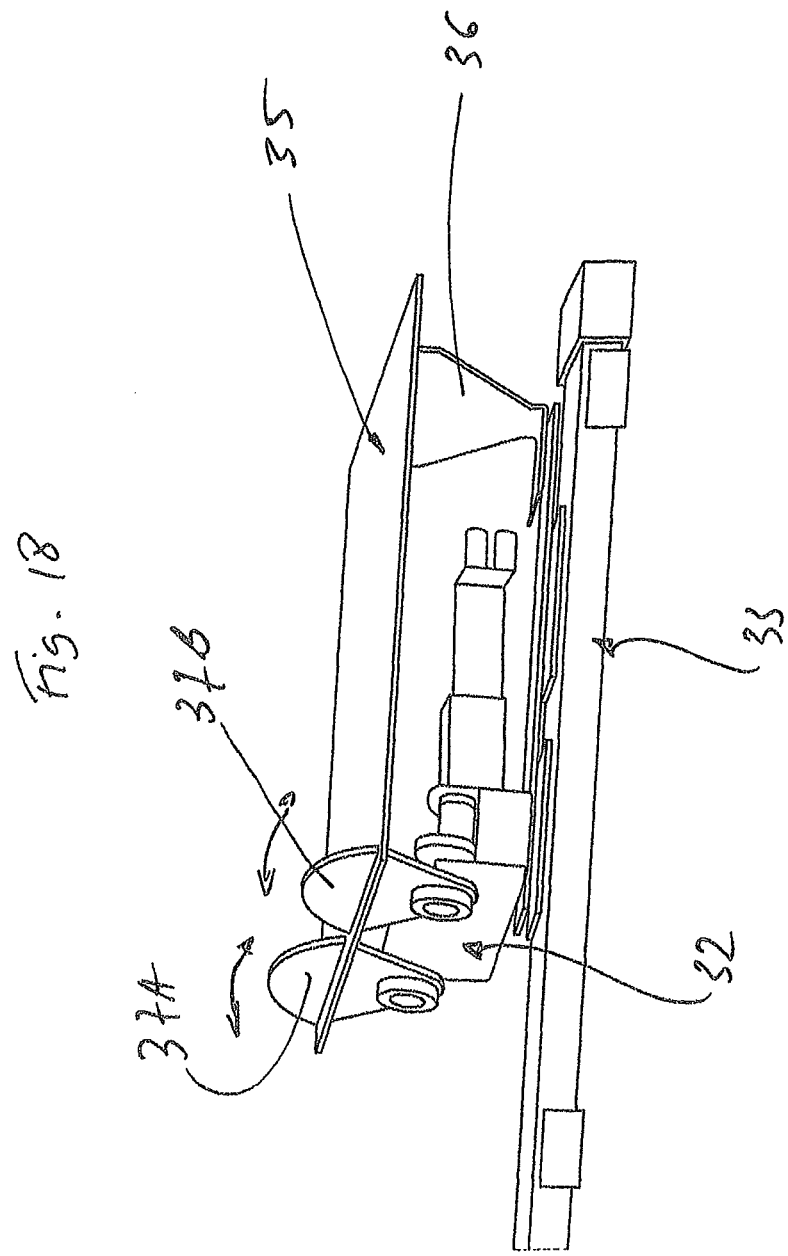
FIG. 18 shows an enlarged detailed view of the transfer cart of FIGS. 11 to 17.
Figure 19:
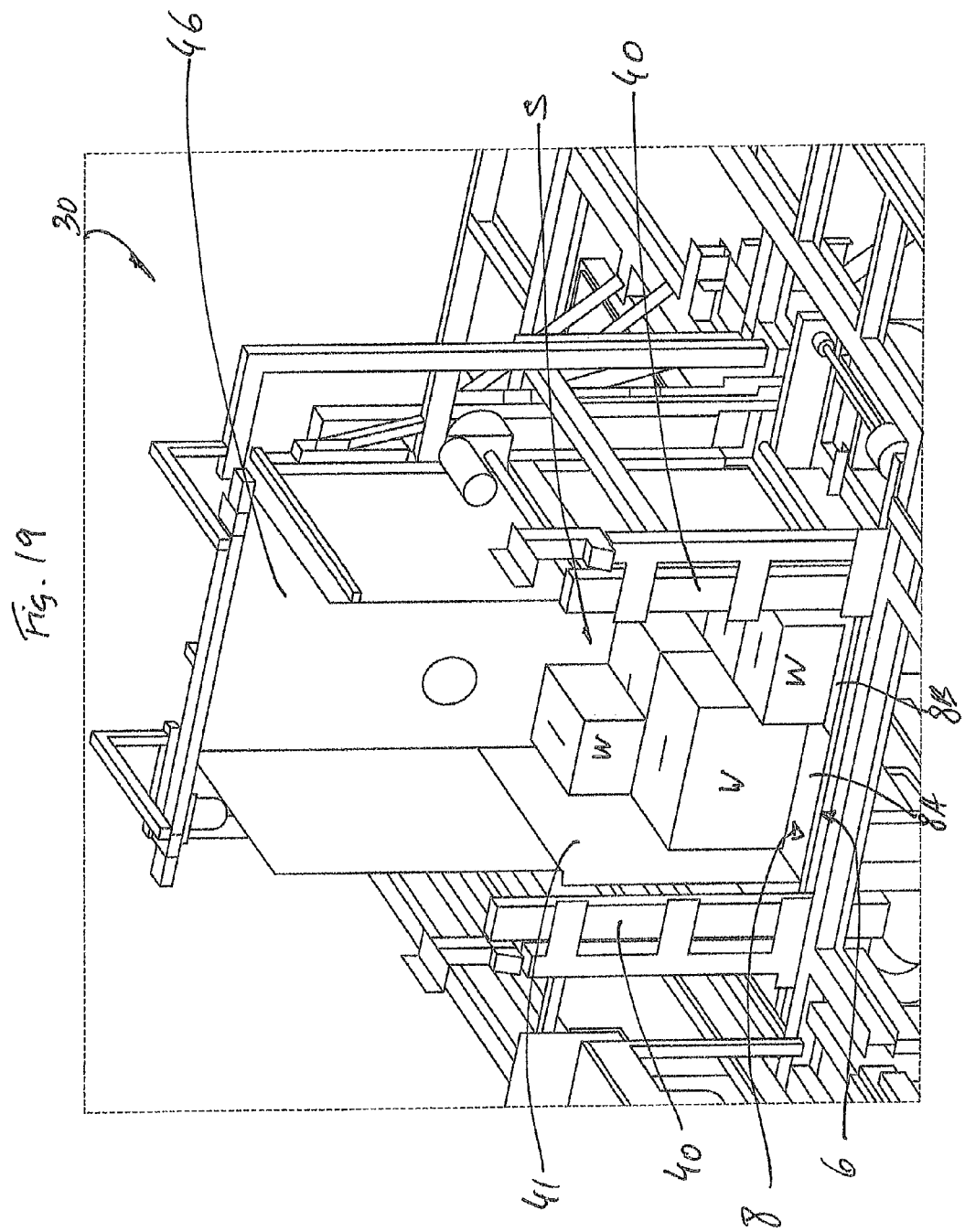
FIG. 19 shows a schematic perspective and enlarged view of the device of FIG. 9 in the region of the stacking location at the end of the stacking procedure.
Figure 20:
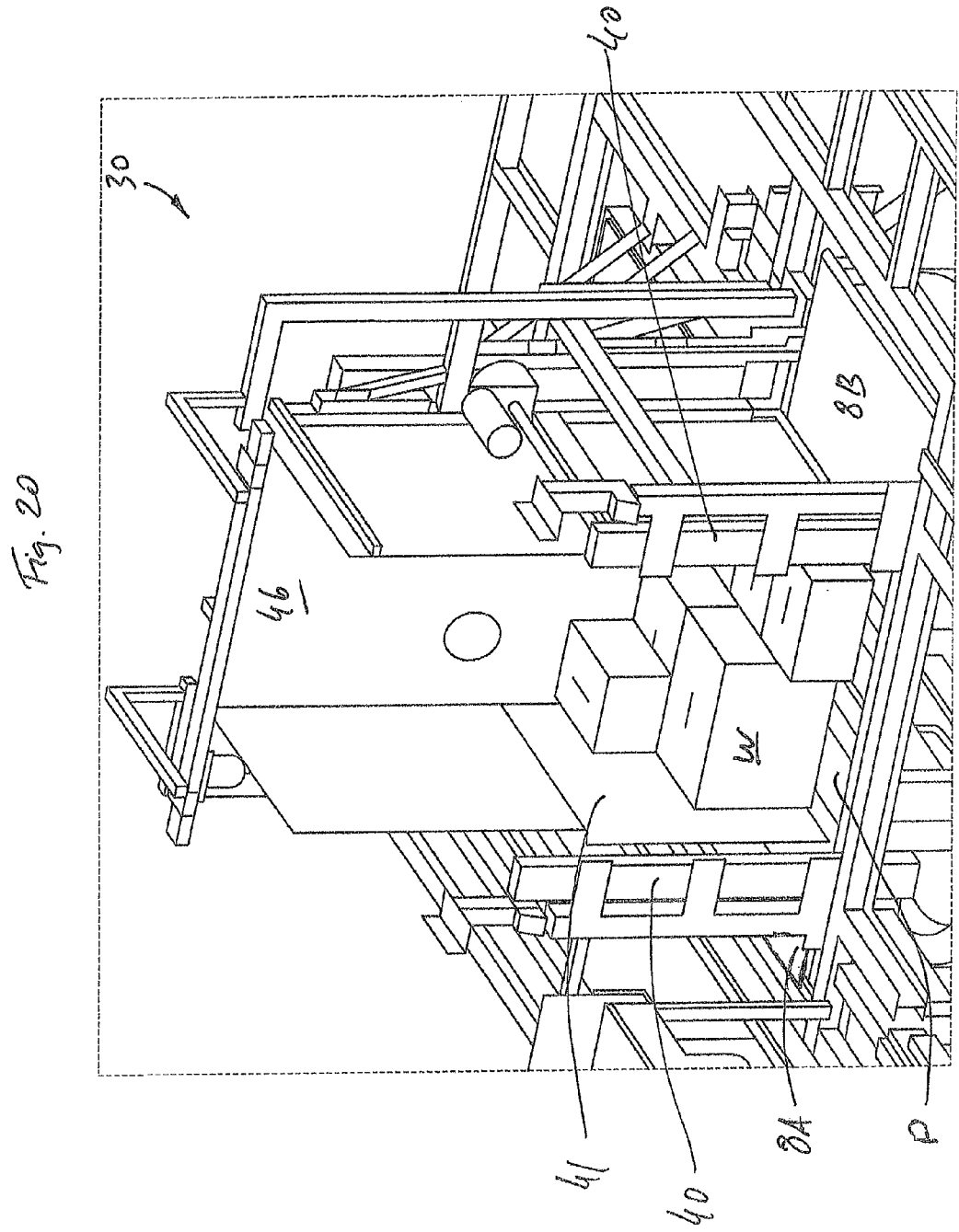
FIG. 20 shows a schematic perspective and enlarged view of the device of FIG. 19 in the region of the stacking location as the stack is transferred from the intermediate plate onto a pallet.

A further difference in this variant is the use of only two sliding plates 13 which are then movable in the X-direction along the stacking location 6 by means of a drive 28, 29 (see drive 28 in FIG. 8A and drives 28, 29 in FIG. 14), so that the respective sliding plate can be positioned corresponding to an individual pusher. For this purpose, the respective linear axle of the sliding plate is designed to be movable in a similar manner to a cross member.

It is also possible to control both sliding plates together, so that a package W is supported on both sliding plates at the same time. Obviously, this can be combined with a corresponding control and use of e.g. two individual pushers.

It will be understood that in the device of FIGS. 1 to 8 a spreading device is also provided but has been omitted from the figures for ease of understanding. However, it fully corresponds to the variant described below.

FIGS. 9 to 26 depict a further device 30 in accordance with the invention, which, in contrast to the devices above, as a positioning conveyor, has a transfer cart or shuttle for transportation of the packages W in the X-direction along the stacking location 6 using the variant of the pusher bank/sliding plate bank arrangement of FIGS. 8A, B.

Furthermore, in conjunction with this embodiment, further details of the design of the stacking location (stacking aids, intermediate plates) etc, are described.

The transfer cart 35 therefore replaces the endless conveyor 4 for the X-direction positioning of the packages W.

The transfer cart 35 receives individual packages W from the feeding conveyor 2. For this purpose, the shifter 31 pushes the packages from the feeding conveyor 2 onto the transfer cart 35.

The transfer cart 35 comprises a movable stop 32 on the remote side, in order to prevent the packages W from falling off the actual transport surface 35T and to permit precise positioning. In order to ensure that the package W does not fall off when the transfer cart 35 is accelerated, the shifter 31 is moved in synchronism with the transfer cart 35 in the X-direction, so that the respective package is transported on the transfer cart 35 clamped between the stop 32 and the shifter 31.

For movement in the X-direction, rails 33 are provided, on which the transfer cart 35 is movable between the stacking location 6 and the pusher/sliding plate unit. Arranged above and in parallel therewith is a corresponding rail 34 for the synchronous movement of the shifter 31. The rails 33, 34 are similarly fastened to the frame 17.

The transfer cart 35 is designed having a C-shaped frame 36, so that the at least one sliding plate can then engage through between the limbs of the "C", so as to prevent any mutual hindrance.

The actual carrier surface 35T for the package is thus fastened only on one side to the travelling mechanism of the transfer cart 35 and protrudes at this location.

The stop 32 is movable, preferably foldable or pivotable, away from the stop position, so that after "transfer" of the package to the sliding plate has been effected (cf. above), the transfer cart is already able to "fetch" the next package.

For this purpose, the stop 32 can be pivoted about an axis from the stop position to a release position. This embodiment does not require much space and also does not "collide" with the sliding plates. The stop comprises two stop wings which are pivotable in opposite directions, in order to provide a broad stop or surface.

This also renders it possible that once the "transfer" of the package W to the sliding plate has been effected, the transfer cart already travels back to receive the next package from the feeding conveyor 2 before the stacking procedure is completed.

The transfer cart 35 thus travels with the package W, which is clamped by the folded-up stop 32 and shifter 31, to the respective pre-calculated X-position on the rails 33.

At the same time, the cross members 21T, 22T for the individual pushers travel from the left and right in the X-direction to the required position in order to interact with the drive carriages 27 of the individual pushers 14, wherein the entraining element 26 engages into the respective groove 27. The sliding plates 13 are likewise positioned in the X-direction.

Then, as described, pushing from the transfer cart 35 (positioning conveyor) is effected by the individual pushers, two pushers in this case, onto the sliding plates, also two in this case, for which reason the drive block 24, 25 travels along the cross member in the Z-direction and in this way entrains the individual pusher 14 in each case. Accordingly, the two sliding plates 13 are extended in the Z-direction, in order to receive the package W from the transfer cart 35, wherein they can "engage through" the transfer cart 35 by reason of the C-shaped frame 36.

As soon as the package W rests completely on the sliding plates, the stop 32 is folded down and the transfer cart 35 can travel back for the purpose of receiving.

The stop 32 is formed by means of two stop disks 37A, B which are rotatable anticlockwise and clockwise respectively. The stop disk 37A is pivoted or folded down in an anticlockwise direction and the stop disk 37B is pivoted or folded down in a clockwise direction from the upright position bounding the package W, so that the transfer cart 35 is free.

Figure 11:
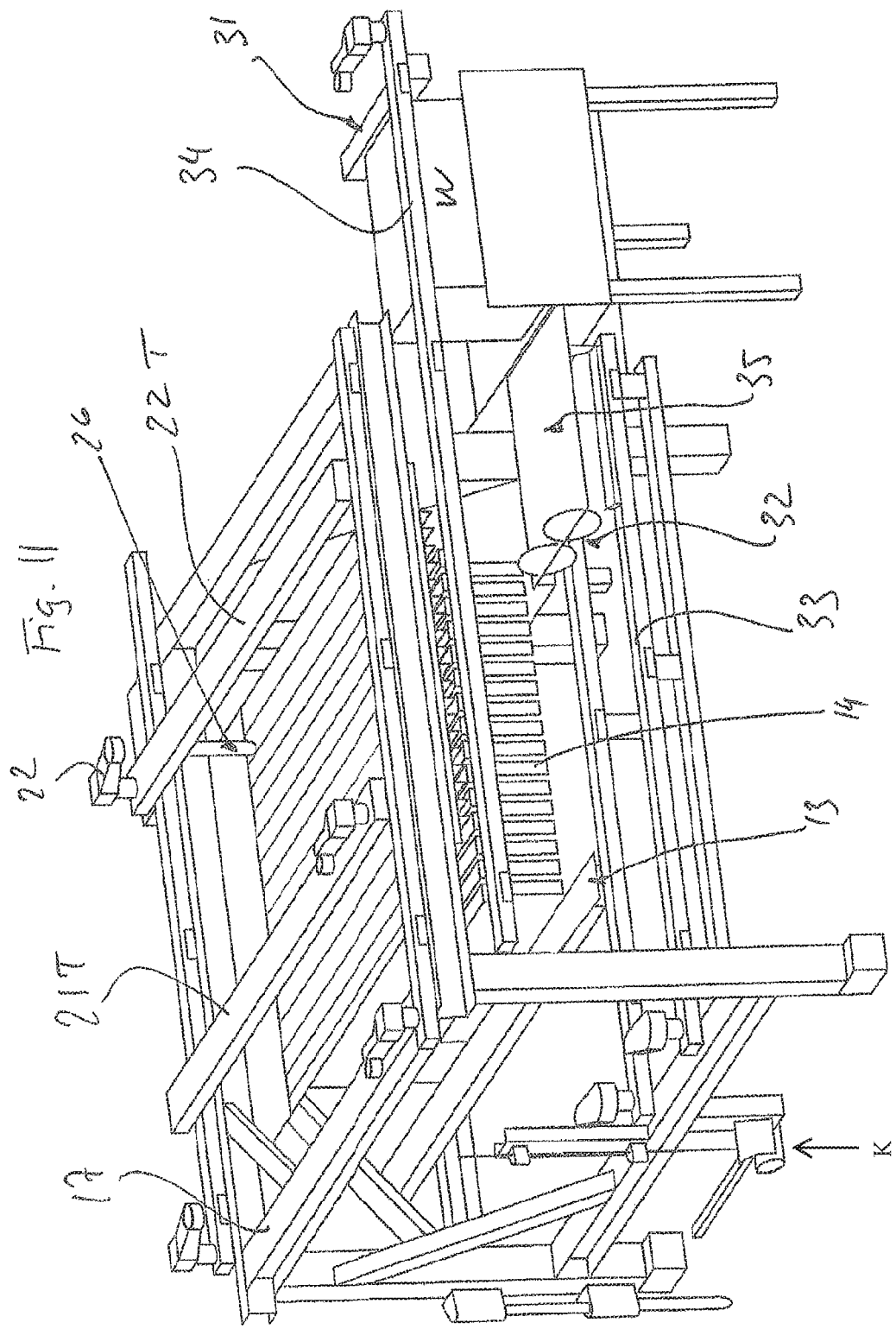
FIG. 11 shows a schematic perspective view of the displacement means of the device of FIG. 9 as a package is received.
Figure 12:
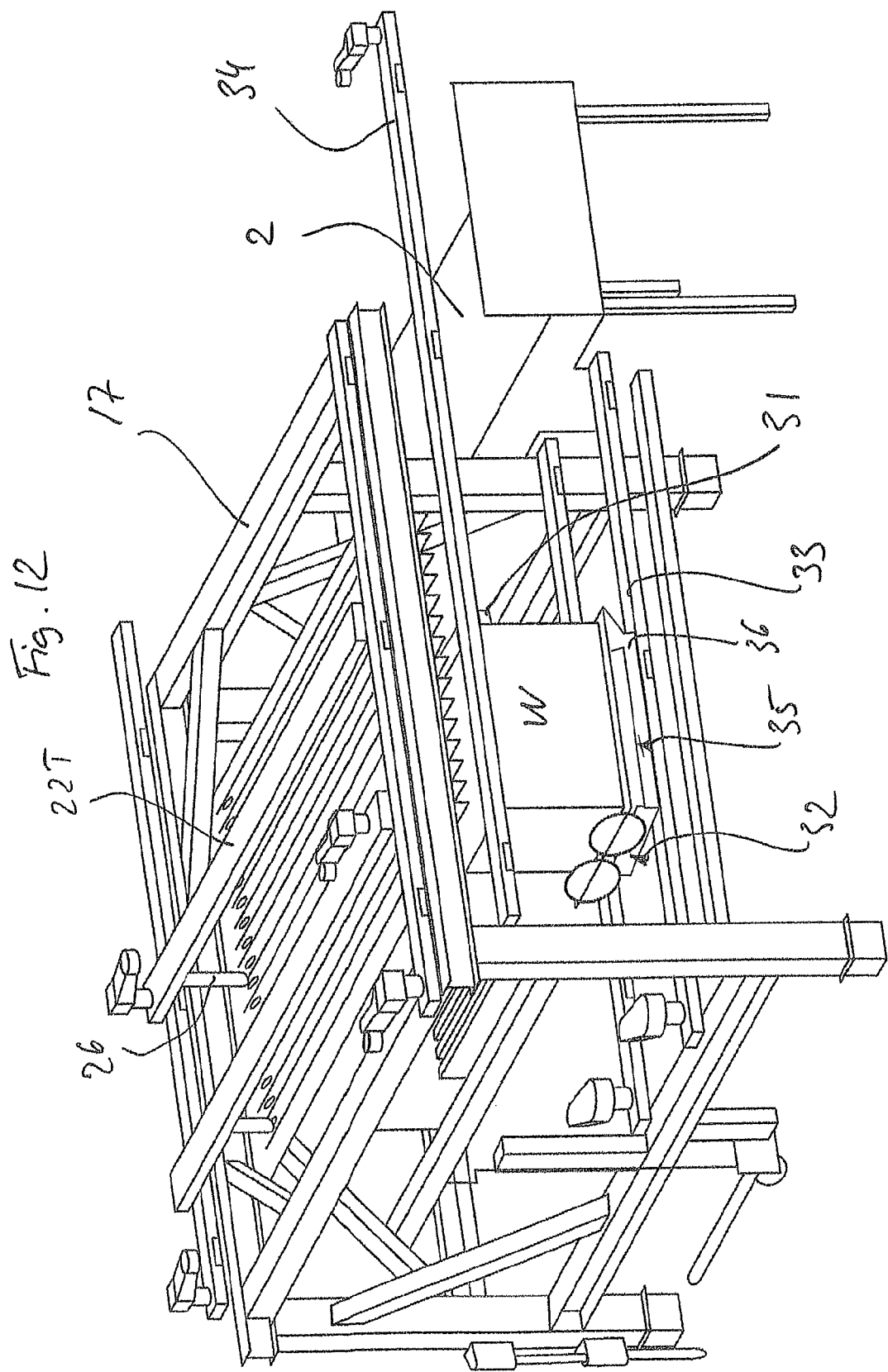
FIG. 12 shows a schematic perspective view of the displacement means of the device of FIG. 9 during transportation of the package in the X-direction.
Figure 13:
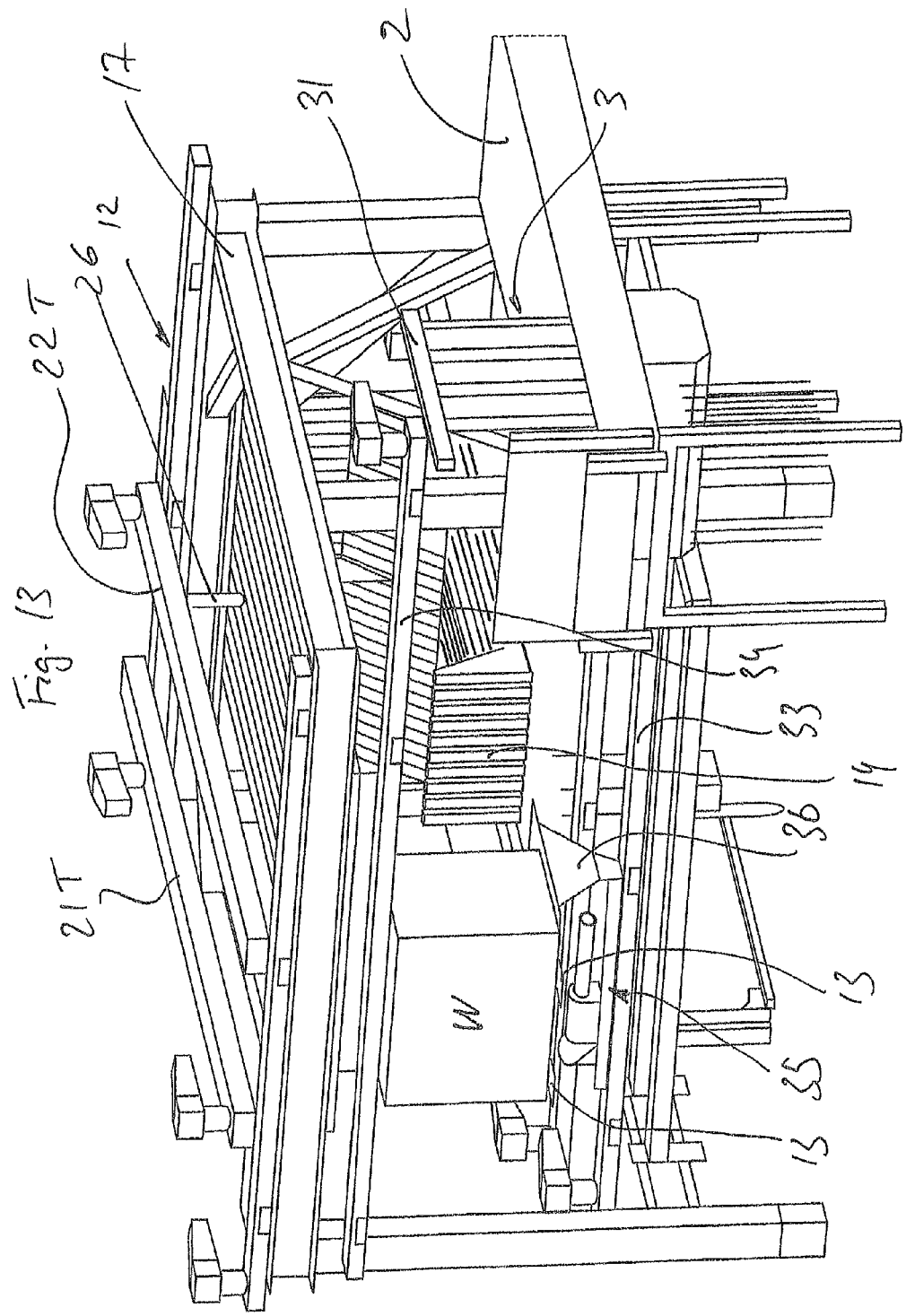
FIG. 13 shows a schematic perspective view of the displacement means of the device of FIG. 9 at the beginning of transportation of the package in the Z-direction.

FIG. 11 also illustrates a manually operated crank K which drives the mechanism in order to permit or facilitate manual intervention, for which reason the frame 17 (together with the unit consisting of the pusher, sliding plates and positioning conveyor etc.) is moved away from the stacking location 6.

FIGS. 19 to 22 show the stacking location 6 in detail during stacking or at the end of stacking in the device 30.

In contrast to the embodiment in FIGS. 1 to 7, in this case, the intermediate plate 8 serves to form not only the first tier of the stack S but also the entire stack S. The stack is only transferred completely to the waiting pallet P (or trolley R, see below) after it has been completed, wherein the lateral walls 41 serve as a scraper.

In order to ensure that this works, the intermediate plate 8 or the parts 8A, B thereof is/are suspended in a height-adjustable manner from a lifting frame 40, so that it can be lowered in each case downwards after completion of one tier, so that the stack level is located at the height of the positioning conveyor.

If the stack S is completed, the parts 8A, B of the intermediate plate 8 are moved towards the side below the edge of the lateral walls 41 (in the X-direction), wherein the packages or the stack remains in the stacking location 6 and comes to rest (cf. FIGS. 19 and 20) on the waiting pallet P (or trolley R, see below) after complete removal of the intermediate plate 8.

Figure 21:
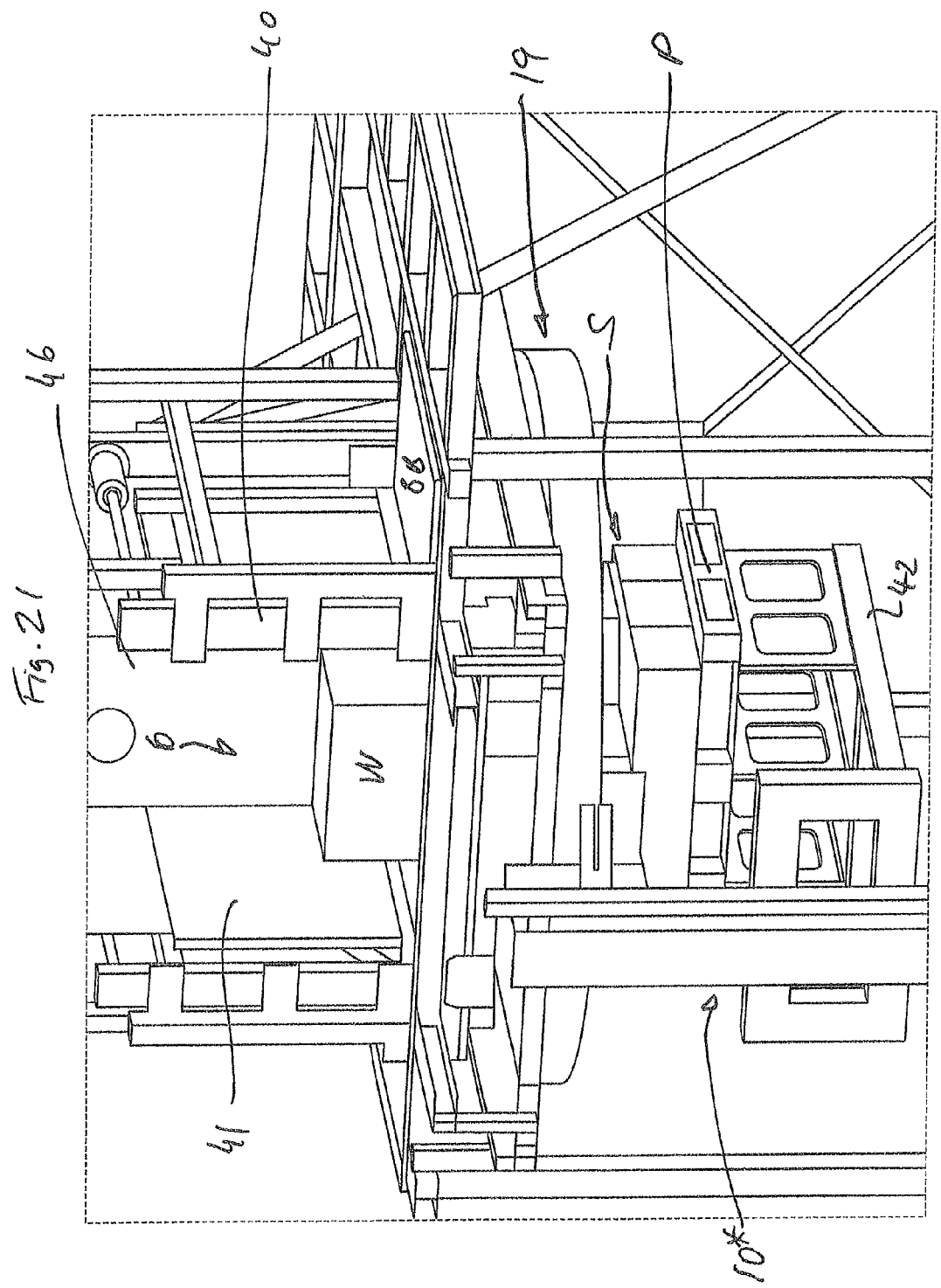
FIG. 21 shows a schematic perspective and enlarged view of the device of FIG. 19 in the region of the stacking location as the stack is lowered.
Figure 22:
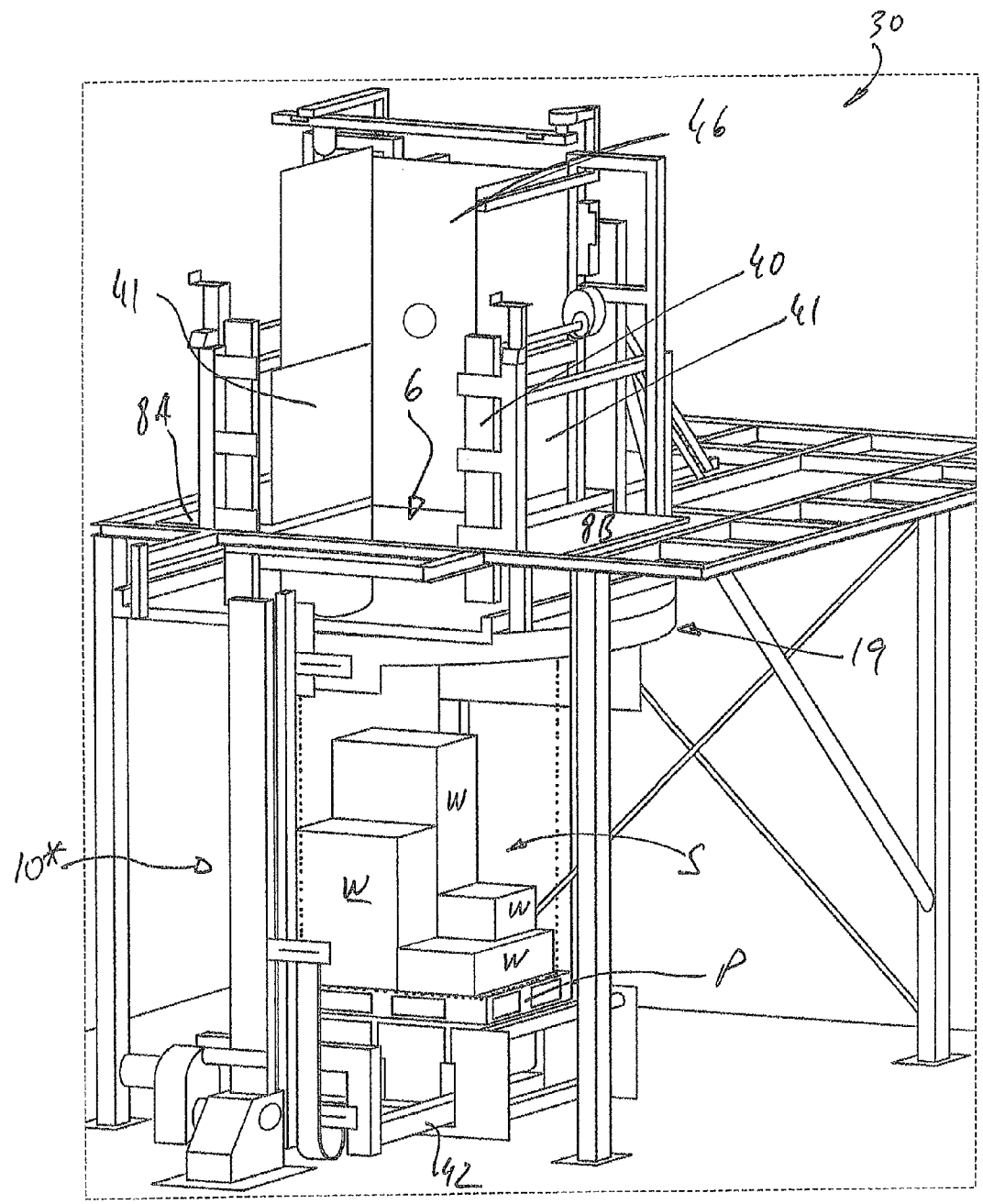
FIG. 22 shows a schematic perspective and enlarged view of the device of FIG. 19 in the region of the stacking location as the stack is being wrapped in film and transported away.
Figure 23:
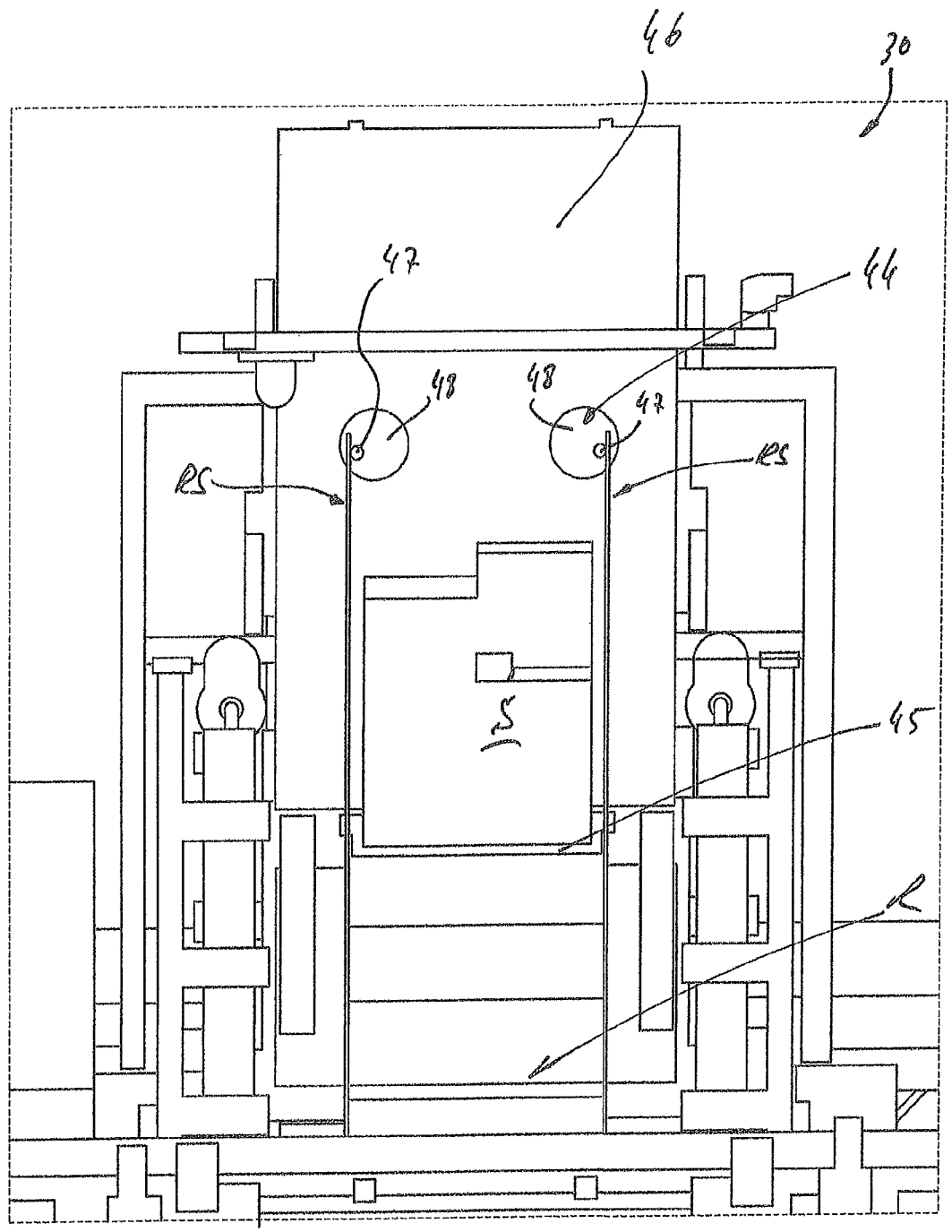
FIG. 23 shows a schematic perspective view of a device for automatic layered stacking in the region of the stacking location during the stacking of trolleys.

The pallet P (or trolley R, see below) with the stack S loaded thereon is lowered further and (as above) passes through a wrapping unit 19 to be wrapped in stretch film for stabilization (cf. FIGS. 21 and 22).

At the same time, the intermediate plate 8 has then been closed and a new stack-forming procedure can be commenced.

Subsequently, the pallet comprising the stack is transferred or unloaded by the fork-like carrier 42 of the lifting and lowering unit 10* onto a roller conveyor 9 to be transported away. The lifting and lowering unit 10* corresponds substantially to the one previously described in conjunction with FIGS. 1 to 7, but in this case is a single-beam lifter.

Subsequently, a new empty pallet for the new stack is received and is lifted to the waiting position below the intermediate plate.

FIGS. 23 to 26 show a schematic perspective view of the previously discussed device 30 for automatic layered stacking, wherein in this case a trolley R is arranged in the region of the stacking location 6 during stacking.

The device 30 is suitable not only for loading pallets P but also for loading trolleys R.

For this purpose, the trolleys R are fed or transported away by the same conveyor 9 as the pallets. For this purpose, the trolleys R are arranged on carrier pallets 43 (cf. FIG. 24) which can be handled in the same way as normal pallets.

The trolleys R are likewise moved by the lifting and lowering unit 10* into the stacking location 6 from below.

In order to spread the sidewalls RS of the trolley R apart, a spreading device 44 is provided which, during stacking, holds the sidewalls RS at least perpendicularly or even bent open in a slightly inclined manner outwards.

The sidewalls RS specifically have the characteristic of moving inwardly towards one another.

Since the sidewalls RS of the trolley R correspond with the parts 8A, B of the intermediate plate and the use thereof is therefore not possible, a separate and height-adjustable intermediate plate 45 arranged on the side of stacking location 6 remote from the positioning conveyor 2 is provided for the stacking of trolleys R.

After the sidewalls RS have been spread, the intermediate plate is introduced from this side in the manner of a carriage into the trolley R in the Z-direction by means of a drive 51. For the purpose of height-adjustment, the intermediate plate 45 is suspended from a lifting frame 50 in a similar manner to the intermediate plate 8.

Subsequently, the stack S is formed, as previously, by placing the packages W on the intermediate plate 45.

When the completely stacked stack is transferred to the trolley R by retracting the further intermediate plate 45, the rear sidewall 46 (which in FIG. 24 has been omitted for improved clarity) serves a scraper. The rear sidewall 46 is also height-adjustable so as to "join in" with the lifting or lowering of the intermediate plate 45, and is movable in the direction of the positioning conveyor 2 or stacking location 6 (Z-direction), so that trolleys of different sizes can be used.

The rear sidewall 46 also serves as an attachment location for the spreading device 44.

The spreading device 44 consists of two pins 47 which are arranged at the same height in the region of the expected sidewalls of the trolley R, protrude from the sidewall forwardly into the trolley space and can be displaced laterally outwards for spreading purposes. For this purpose, the pins 47 are arranged in each case on a vertically oriented rotary disk 48 driven by a common drive 49 by means of a rotating cable 53. The drive is arranged on the rear wall of the rear sidewall 46 (cf. FIGS. 25 and 26).

As the trolley is introduced, the pins 47 are thus positioned on the inside. After the trolley has been introduced, the pins are displaced outwards by a rotation of the rotary disks 48 and thus spread the sidewalls RS.

If the stacking procedure is completed, the pins 47 are then moved inwards and the intermediate plate 45 is retracted at the rear sidewall 46 serving as a scraper, so that the stack S of the packages W comes to lie on the trolley R.

Subsequently, the stack is moved by means of the lifting and lowering unit 10\* through the film-wrapping unit 19 and finally on the roller conveyor 9 to be transported away.

The procedure can then start anew.

The invention claimed is:

1. Device for automatically stacking packages on a support in a predetermined spatial arrangement to form a stack, comprising:
    at least one feeding conveyor which provides singulated packages in a predetermined sequence;
    a lifting and lowering unit for lifting and lowering a support, which is arranged in a stacking location, in the Y-direction;
    a displacement device which adjoins an output end of the feeding conveyor and receives packages from the feeding conveyor and transports the packages to the predetermined position in the stack;
    wherein the displacement device comprises:
        a positioning conveyor which adjoins the output end of the feeding conveyor and is arranged horizontally and along a side of the stacking location, in order to position the packages in the X-direction, with the positioning conveyor configured to receive packages from the feeding conveyor, and
        at least one sliding plate and a pusher, in order to transport the packages from the positioning conveyor in the Z-direction to the predetermined position in the stack,
    wherein the at least one sliding plate is movable horizontally and along the side of the stacking location and transversely thereto, in order to receive the packages from the positioning conveyor at the X-direction position when the packages are pushed by the pusher and to place same on the support or in the stack in the Z-direction, and wherein the device has a spreading device in order to spread side walls of a support comprising a rolling container for stacking purposes when the rolling container is at the stacking location, and wherein the spreading device has two pins which are arranged at the same height in the region of the expected sidewalls of the rolling container and protrude into the stacking location and wherein the pins are movable between a spreading position and a non-spreading position.

2. Device as claimed in claim 1, wherein the pins can be displaced laterally outwards for spreading purposes.

3. Device as claimed in claim 2, wherein the pins are each arranged on a vertically oriented rotary disc.

4. Device as claimed in claim 3, wherein the rotary discs have a common drive by means of a rotating cable.

5. Device as claimed in claim 4, wherein the spreading device is arranged on a rear side wall defining the stacking location.

6. Device as claimed in claim 5, wherein the rolling container is arranged on a carrier pallet.

7. Device as claimed in claim 1, wherein the pins are each arranged on a vertically oriented rotary disc.

8. Device as claimed in claim 7, wherein the rotary discs have a common drive.

9. Device as claimed in claim 8, wherein the common drive comprises a rotating cable.

10. Device as claimed in claim 1, wherein the spreading device is arranged on a rear side wall defining the stacking location.

11. Device as claimed in claim 10, wherein the pins can be displaced laterally outwards for spreading purposes.

12. Device as claimed in claim 1, wherein the rolling container is arranged on a carrier pallet.

13. A method for automatically stacking packages on a support in a predetermined spatial arrangement to form a stack, comprising the steps of:
    receiving the packages from a feeding conveyor;
    displacing the packages to the predetermined position in the stack, by positioning the packages in the X-direction and positioning the packages in the Z-direction and lifting and lowering the support arranged in a stacking location;
    wherein pallets or rolling containers are used as desired as the support, and wherein the device has a spreading device in order to spread side walls of the rolling containers for stacking purposes when the rolling container is at the stacking location, and wherein the spreading device has two pins which are arranged at the same height in the region of the expected sidewalls of a rolling container and protrude into the stacking location and wherein the pins are movable between a spreading position and a non-spreading position.

14. The method as claimed in claim 13, wherein the pins can be displaced laterally outwards for spreading purposes.

15. The method as claimed in claim 14, wherein the pins are each arranged on a vertically oriented rotary disc.

16. The method as claimed in claim 15, wherein the rotary discs have a common drive.

17. The method as claimed in claim 16, wherein the common drive comprises a rotating cable.

18. The method as claimed in claim 13, wherein the spreading device is arranged on a rear side wall defining the stacking location.

19. The method as claimed in claim 13, wherein displacing the packages to the predetermined position in the stack comprises a lifting and lowering unit for lifting and lowering the support in the Y-direction.

20. The method as claimed in claim 19, wherein displacing the packages to the predetermined position in the stack comprises a displacement device which adjoins an output end of the feeding conveyor and receives packages from the feeding conveyor and transports the packages to the predetermined position in the stack, wherein the displacement device comprises a positioning conveyor which adjoins the output end of the feeding conveyor and is arranged horizontally and along a side of the stacking location, in order to position the packages in the X-direction, with the positioning conveyor configured to receive packages from the feeding conveyor, and at least one sliding plate and a pusher, in order to transport the packages from the positioning conveyor in the Z-direction to the predetermined position in the stack.

21. The method as claimed in claim 20, wherein the at least one sliding plate is movable horizontally and along the side of the stacking location and transversely thereto, in order to receive the packages from the positioning conveyor at the X-direction position when the packages are pushed by the pusher and to place same on the support or in the stack in the Z-direction.

* * * * *